United States Patent
Chen et al.

(10) Patent No.: US 11,601,651 B2
(45) Date of Patent: Mar. 7, 2023

(54) METHOD AND APPARATUS FOR MOTION VECTOR REFINEMENT

(71) Applicant: ALIBABA GROUP HOLDING LIMITED, Grand Cayman (KY)

(72) Inventors: Jie Chen, San Mateo, CA (US); Ru-Ling Liao, San Mateo, CA (US); Yan Ye, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/881,043

(22) Filed: May 22, 2020

(65) Prior Publication Data

US 2020/0404284 A1 Dec. 24, 2020

Related U.S. Application Data

(60) Provisional application No. 62/865,908, filed on Jun. 24, 2019.

(51) Int. Cl.
| | |
|---|---|
| *H04N 11/02* | (2006.01) |
| *H04N 19/137* | (2014.01) |
| *H04N 19/132* | (2014.01) |
| *H04N 19/176* | (2014.01) |
| *H04N 19/625* | (2014.01) |
| *H04N 19/119* | (2014.01) |

(52) U.S. Cl.
CPC ......... *H04N 19/137* (2014.11); *H04N 19/119* (2014.11); *H04N 19/132* (2014.11); *H04N 19/176* (2014.11); *H04N 19/625* (2014.11)

(58) Field of Classification Search
CPC .................................................. H04N 19/137
USPC ........................................ 375/240.01–240.29
See application file for complete search history.

(56) References Cited

U.S. PATENT DOCUMENTS

| | | | | |
|---|---|---|---|---|
| 8,917,757 B2* | 12/2014 | Young | ................. | H04N 19/176 |
| | | | | 375/134 |
| 8,964,836 B2* | 2/2015 | Park | .................... | H04N 19/593 |
| | | | | 375/240.12 |
| 9,036,932 B2* | 5/2015 | Yang | ..................... | H04N 19/11 |
| | | | | 382/238 |
| 9,106,917 B2* | 8/2015 | Shimada | ............... | H04N 19/11 |

(Continued)

FOREIGN PATENT DOCUMENTS

WO  WO-2019099444 A1 *  5/2019  ............. H04N 19/52

OTHER PUBLICATIONS

PCT International Search Report and Written Opinion dated Jul. 31, 2020, issued in corresponding International Application No. PCT/US2020/034132 (16 pgs.).

(Continued)

*Primary Examiner* — Leron Beck
(74) *Attorney, Agent, or Firm* — Finnegan, Henderson, Farabow, Garrett & Dunner, LLP

(57) ABSTRACT

The present disclosure provides a method and an apparatus for motion vector refinement. An exemplary method includes: determining a plurality of first blocks associated with a first motion vector and a plurality of second blocks associated with a second motion vector; determining a sum of absolute transformed difference (SATD) between one of the plurality of first blocks and one of the plurality of second blocks; and refining the first motion vector and the second motion vector based on the determined SATDs.

14 Claims, 18 Drawing Sheets

(56) References Cited

U.S. PATENT DOCUMENTS

| | | | |
|---|---|---|---|
| 9,148,667 B2* | 9/2015 | Chien | H04N 19/19 |
| 9,204,149 B2* | 12/2015 | Ramachandran | H04N 19/147 |
| 9,225,996 B2* | 12/2015 | Ramachandran | H04N 19/523 |
| 9,769,472 B2* | 9/2017 | Liu | H04N 19/33 |
| 9,967,558 B1* | 5/2018 | Han | H04N 19/176 |
| 10,003,792 B2* | 6/2018 | Peng | H04N 19/136 |
| 10,779,002 B2* | 9/2020 | Chen | H04N 19/139 |
| 2006/0233258 A1 | 10/2006 | Holcomb | |
| 2008/0198934 A1 | 8/2008 | Hong et al. | |
| 2009/0092189 A1 | 4/2009 | Tsuchiya et al. | |
| 2009/0296820 A1 | 12/2009 | Hiranuma et al. | |
| 2010/0303148 A1* | 12/2010 | Hiron | H04N 19/147 375/240.03 |
| 2011/0026596 A1* | 2/2011 | Hong | H04N 5/145 375/240.16 |
| 2012/0300834 A1 | 11/2012 | Metoevi et al. | |
| 2013/0266070 A1* | 10/2013 | Sato | H04N 19/119 375/240.16 |
| 2016/0323599 A1 | 11/2016 | Lu et al. | |
| 2017/0289566 A1* | 10/2017 | He | H04N 19/52 |
| 2020/0029087 A1* | 1/2020 | Lim | H04N 19/119 |
| 2020/0195973 A1* | 6/2020 | Xu | H04N 19/105 |
| 2020/0288168 A1* | 9/2020 | Zhang | H04N 19/583 |
| 2020/0404302 A1* | 12/2020 | Heo | H04N 19/196 |

OTHER PUBLICATIONS

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

Sullivan et al., "Overview of the High Efficiency Video Coding (HEVC) Standard," IEEE Transactions on Circuits and Systems for Video Technology, vol. 22, No. 12, pp. 1649-1668, Dec. 2012.

Chen et al. "Algorithm description of Joint Exploration Test Model 7 (JEM7)", Joint Video Exploration Team (JVET), JVET-G1001, 7th Meeting: Torino, IT, Jul. 13-21, 2017, .48 pages.

Segall, "Joint Call for Proposals on Video Compression with Capability beyond HEVC," Joint Video Experts Team (JVET), JVET-H1002, 8th Meeting: Macao, CN, Oct. 18-24, 2017, 27 pages.

Bross et al. "Versatile Video Coding (draft 4)", Joint Video Experts Team (JVET), JVET-M1001, 13th Meeting: Marrakech, MA, Jan. 9-18, 2019, 300 pages.

Chen et al. "Algorithm description for Versatile Video Coding and Test Model 5 (VTM 5)," Joint Video Experts Team (JVET), 14th Meeting: Geneva, CH, Mar. 19-27, 2019, JVET-N1002, Mar. 2019, 76 pages.

International Telecommunications Union "Series H: Audiovisual and Multimedia Systems Infrastructure of audiovisual services—Coding of moving video", ITU-T Telecommunication Standardization Sector of ITU, Oct. 2014, 540 pages.

* cited by examiner

Decoder Side Motion Vector Refinement

700
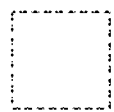 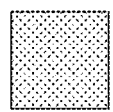 
P1 P5
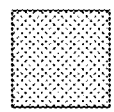 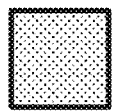 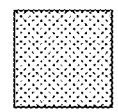
P4 center P3
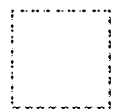 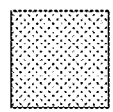 
P2
DMVR Integer Luma Sample Searching Pattern
FIG. 7

DMVR Parametric Error Surface Estimation

Extended CU Region Used In BDOF

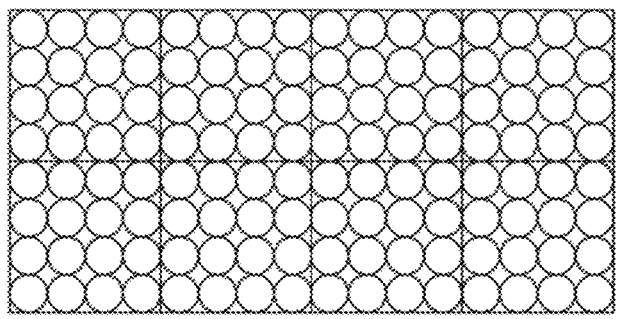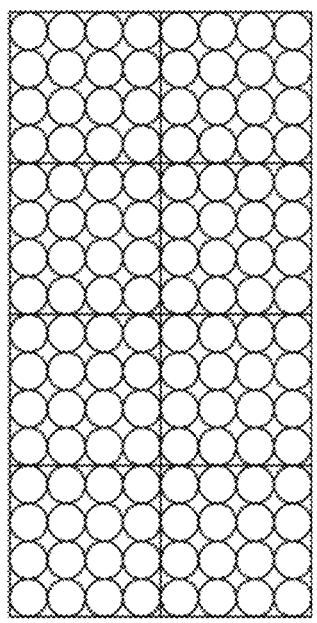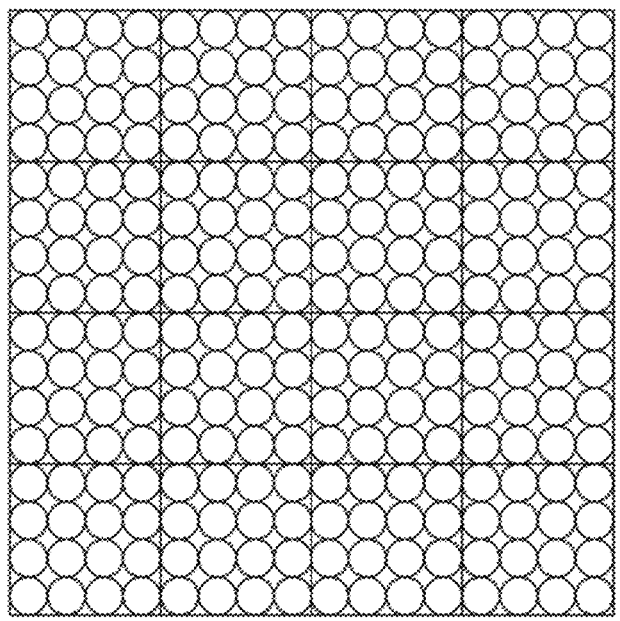
FIG. 13 Split DMVR Block Into 4x4 Sub-Blocks

Split DMVR Block Into Sub-Blocks With Different Sizes

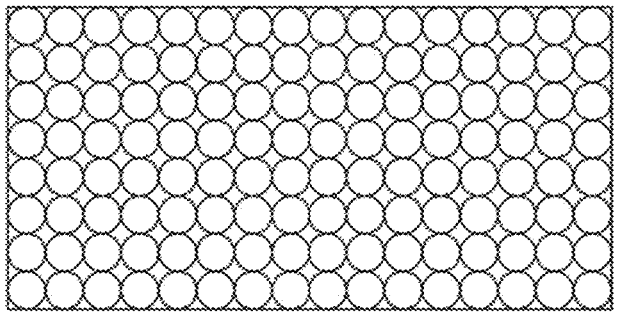
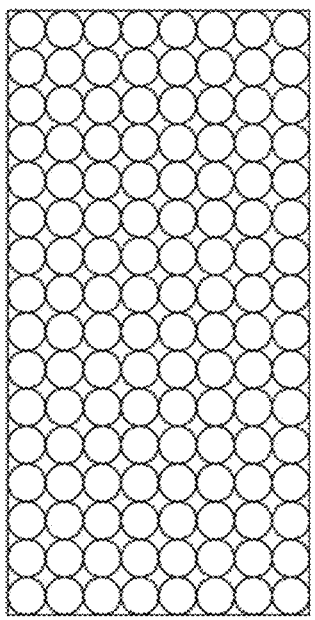
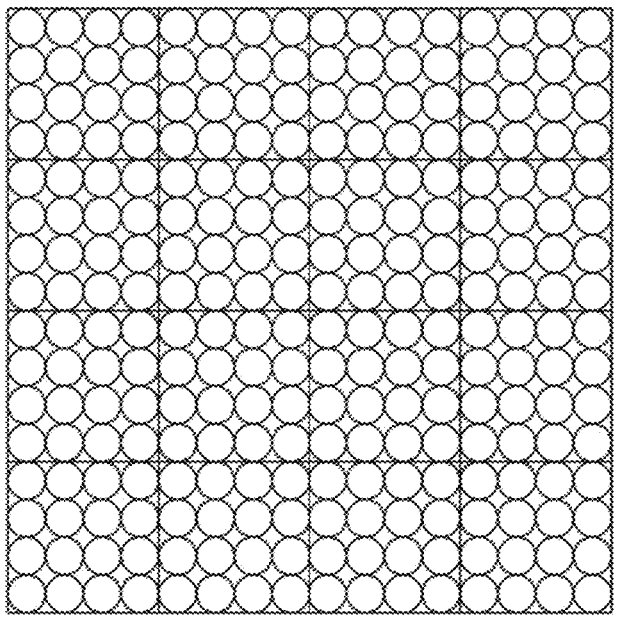
Split DMVR Block Or Not Dependent On DMVR Block Size
FIG. 15

1700

Determine a plurality of first blocks associated with a first motion vector and a plurality of second blocks associated with a second motion vector — 1702

Determine a SATD between one of the plurality of first blocks and one of the plurality of second blocks — 1704

Refine the first motion vector and the second motion vector based on the determined SATDs — 1706

FIG. 17

METHOD AND APPARATUS FOR MOTION VECTOR REFINEMENT

CROSS-REFERENCE TO RELATED APPLICATIONS

The present disclosure claims priority to U.S. provisional application No. 62/865,908, filed on Jun. 24, 2019, which is incorporated herein by reference in its entirety.

TECHNICAL FIELD

The present disclosure generally relates to video data processing, and more particularly, to a method and an apparatus for motion vector refinement.

BACKGROUND

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

SUMMARY OF THE DISCLOSURE

The embodiments of the present disclosure provide a method and apparatus for motion vector refinement. In some embodiments, an exemplary method includes: determining a plurality of first blocks associated with a first motion vector and a plurality of second blocks associated with a second motion vector; determining a sum of absolute transformed difference (SATD) between one of the plurality of first blocks and one of the plurality of second blocks; and refining the first motion vector and the second motion vector based on the determined SATDs.

In some embodiments, an exemplary apparatus includes a memory configured to store instructions and a processor coupled to the memory. The processor can be configured to execute the instructions to cause the apparatus to: determine a plurality of first blocks associated with a first motion vector and a plurality of second blocks associated with a second motion vector; determine a SATD between one of the plurality of first blocks and one of the plurality of second blocks; and refine the first motion vector and the second motion vector based on the determined SATDs.

In some embodiments, an exemplary non-transitory computer-readable storage medium stores a set of instructions. The set of instructions are executable by one or more processors of a device to cause the device to perform: determining a plurality of first blocks associated with a first motion vector and a plurality of second blocks associated with a second motion vector; determining a SATD between one of the plurality of first blocks and one of the plurality of second blocks; and refining the first motion vector and the second motion vector based on the determined SATDs.

BRIEF DESCRIPTION OF THE DRAWINGS

Embodiments and various aspects of the present disclosure are illustrated in the following detailed description and the accompanying figures. Various features shown in the figures are not drawn to scale.

FIG. 7 is a schematic diagram illustrating an example of DMVR integer luma sample searching pattern, according to some embodiments of the present disclosure.

FIG. 13 is a schematic diagram illustrating examples of splitting DMVR block into 4×4 sub-blocks, according to some embodiments of the present disclosure.

FIG. 15 is a schematic diagram illustrating examples of splitting DMVR block or not dependent on DMVR block size, according to some embodiments of the present disclosure.

FIG. 17 illustrates a flowchart of an exemplary method for motion vector refinement, according to some embodiments of the present disclosure

DETAILED DESCRIPTION

Figure 1:
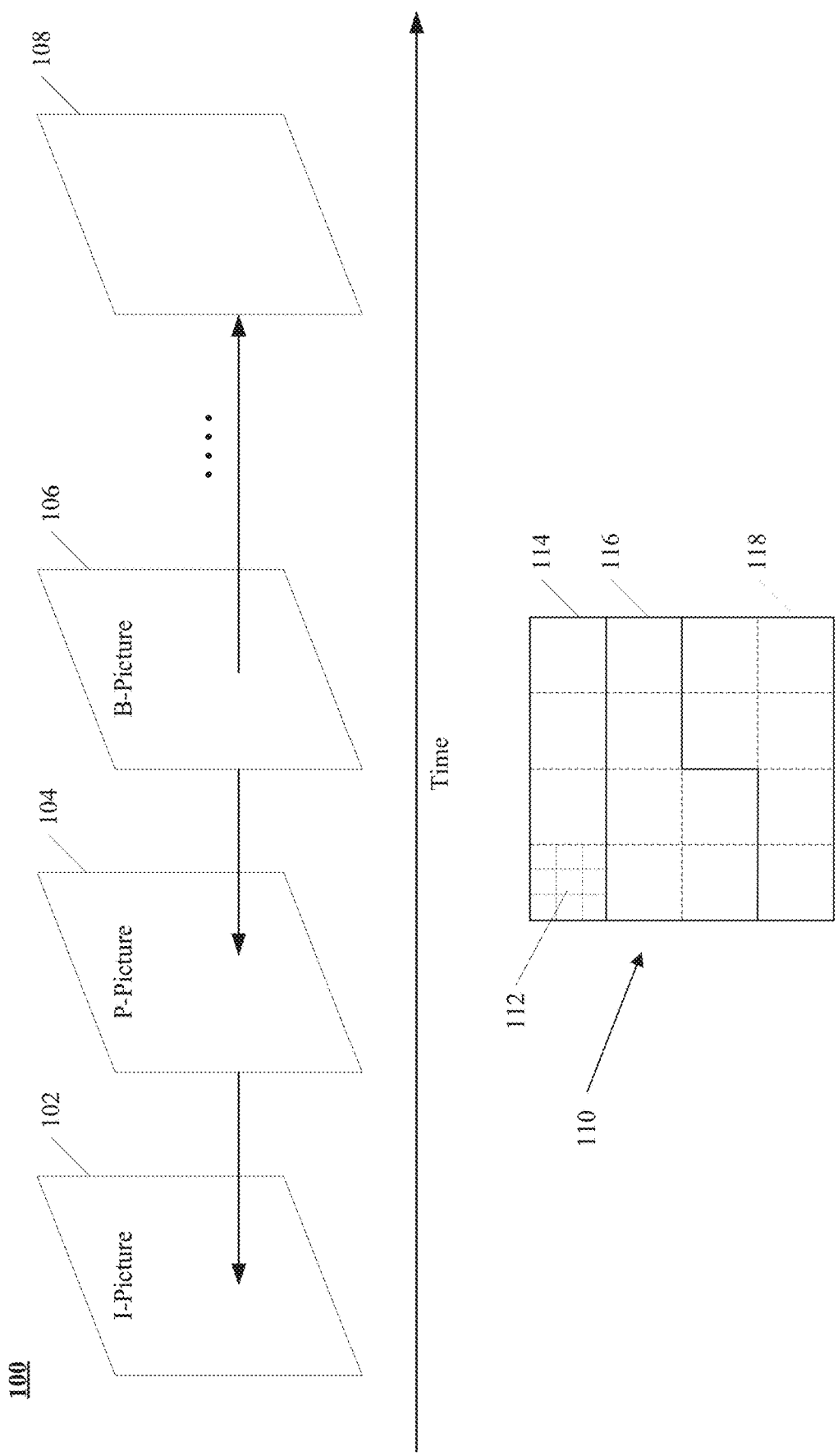
FIG. 1 is a schematic diagram illustrating structures of an example video sequence, according to some embodiments of the present disclosure.

Reference can now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

In order to achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC. The VCEG and MPEG have started the development of next generation video compression standard beyond HEVC.

The VVC standard is continuing to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Figure 2:
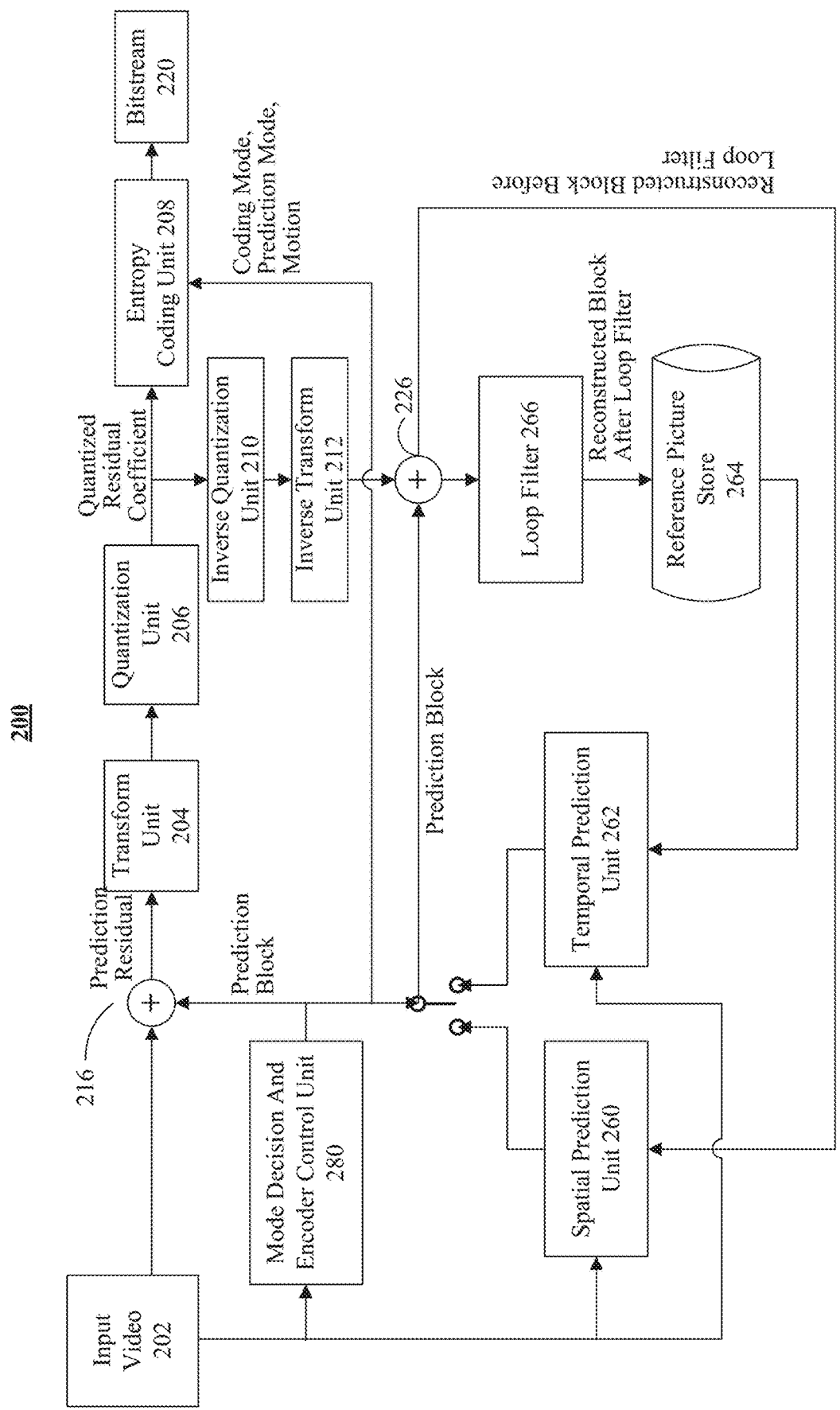
FIG. 2 illustrates a schematic diagram of an exemplary encoder in a hybrid video coding system, according to some embodiments of the present disclosure.
Figure 3:
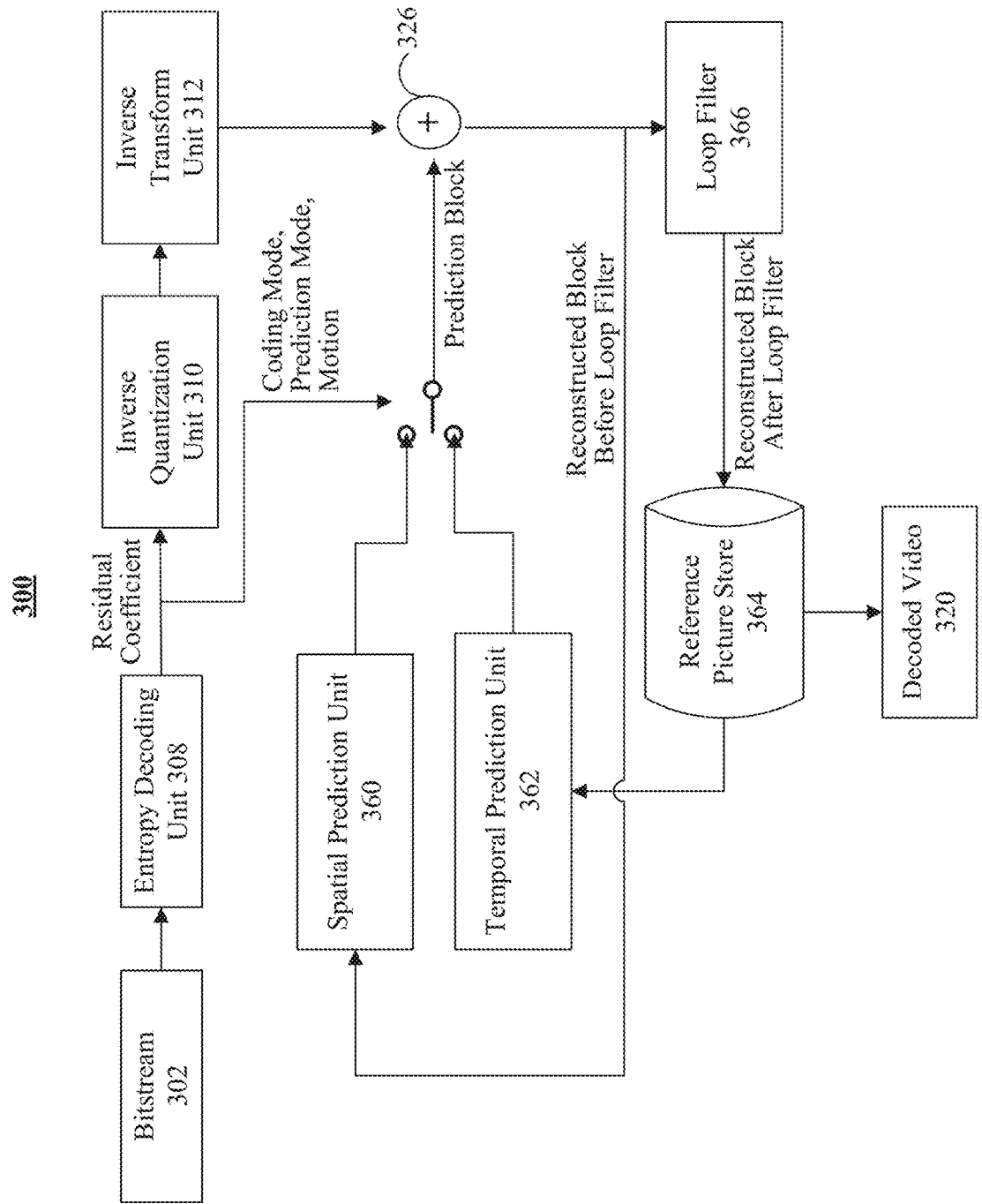
FIG. 3 illustrates a schematic diagram of an exemplary decoder in a hybrid video coding system, according to some embodiments of the present disclosure.

Video coding has multiple stages of operations, examples of which are shown in FIG. 2 and FIG. 3. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

For example, at a mode decision stage (an example of which is shown in FIG. 2), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIG. 2), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIG. 2), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2 illustrates a schematic diagram of an exemplary encoder 200 in a hybrid video coding system, according to some embodiments of the present disclosure. Video encoder 200 may perform intra- or inter-coding of blocks within video frames, including video blocks, or partitions or sub-partitions of video blocks. Intra-coding may rely on spatial prediction to reduce or remove spatial redundancy in video within a given video frame. Inter-coding may rely on temporal prediction to reduce or remove temporal redundancy in video within adjacent frames of a video sequence. Intra modes may refer to a number of spatial based compression modes. Inter modes (such as uni-prediction or bi-prediction) may refer to a number of temporal-based compression modes.

Referring to FIG. 2, input video signal 202 may be processed block by block. For example, the video block unit may be a 16×16 pixel block (e.g., a macroblock (MB)). The size of the video block units may vary, depending on the coding techniques used, and the required accuracy and efficiency. In HEVC, extended block sizes (e.g., a coding tree unit (CTU)) may be used to compress video signals of resolution, e.g., 1080p and beyond. In HEVC, a CTU may include up to 64×64 luma samples corresponding chroma samples, and associated syntax elements. In VVC, the size of a CTU may be further increased to include 128×128 luma samples, corresponding chroma samples, and associated syntax elements. A CTU can be further divided into coding units (CUs) using, for example, quad-tree, binary tree, or ternary tree. A CU may be further partitioned into prediction units (PUs), for which separate prediction methods may be applied. Each input video block may be processed by using spatial prediction unit 260 or temporal prediction unit 262.

Spatial prediction unit 260 performs spatial prediction (e.g., intra prediction) to the current block/CU using information on the same picture/slice containing the current block. Spatial prediction may use pixels from the already coded neighboring blocks in the same video picture frame/slice to predict the current video block. Spatial prediction may reduce spatial redundancy inherent in the video signal.

Temporal prediction unit 262 performs temporal prediction (e.g., inter prediction) to the current block using information from picture(s)/slice(s) different from the picture/slice containing the current block. Temporal prediction for a video block may be signaled by one or more motion vectors. In unit-directional temporal prediction, only one motion vector indicating one reference picture is used to generate the prediction signal for the current block. On the other hand, in bi-directional temporal prediction, two motion vectors, each indicating a respective reference picture, can be used to generate the prediction signal for the current block. The motion vectors may indicate the amount and the direction of motion between the current block and one or more associated block(s) in the reference frames. If multiple reference pictures are supported, one or more reference picture indices may be sent for a video block. The one or more reference indices may be used to identify from which reference picture(s) in the reference picture store or decoded picture buffer (DPB) 264, the temporal prediction signal may come.

Mode decision and encoder control unit 280 in the encoder may choose the prediction mode, for example, based on rate-distortion optimization. Based on the determined prediction mode, the prediction block can be obtained. The prediction block may be subtracted from the current video block at adder 216. The prediction residual may be transformed by transformation unit 204 and quantized by quantization unit 206. The quantized residual coefficients may be inverse quantized at inverse quantization unit 210 and inverse transformed at inverse transform unit 212 to form the reconstructed residual. The reconstructed residual may be added to the prediction block at adder 226 to form the reconstructed video block. The reconstructed video block before loop-filtering may be used to provide reference samples for intra prediction.

The reconstructed video block may go through loop filtering at loop filter 266. For example, loop filtering such as deblocking filter, sample adaptive offset (SAO), and adaptive loop filter (ALF) may be applied. The reconstructed block after loop filtering may be stored in reference picture store 264 and can be used to provide inter prediction reference samples for coding other video blocks. To form the output video bitstream 220, coding mode (e.g., inter or intra), prediction mode information, motion information, and quantized residual coefficients may be sent to the entropy coding unit 208 to further reduce the bit rate, before the data are compressed and packed to form bitstream 220.

FIG. 3 illustrates a schematic diagram of an exemplary decoder 300 in a hybrid video coding system, according to some embodiments of the present disclosure. Referring to FIG. 3, a video bitstream 302 may be unpacked or entropy decoded at entropy decoding unit 308. The coding mode information can be used to determine whether the spatial prediction unit 360 or the temporal prediction unit 362 is to be selected. The prediction mode information can be sent to the corresponding prediction unit to generate the prediction block. For example, motion compensated prediction may be applied by the temporal prediction unit 362 to form the temporal prediction block.

The residual coefficients may be sent to inverse quantization unit 310 and inverse transform unit 312 to obtain the reconstructed residual. The prediction block and the reconstructed residual can be added together at 326 to form the reconstructed block before loop filtering. The reconstructed block may then go through loop filtering at loop filer 366. For example, loop filtering such as deblocking filter, SAO, and ALF may be applied. The reconstructed block after loop filtering can then be stored in reference picture store 364. The reconstructed data in the reference picture store 364 may be used to obtain decoded video 320, or used to predict future video blocks. Decoded video 320 may be displayed on a display device, such as a TV, a PC, a smartphone, or a tablet to be viewed by the end-users.

Figure 4:
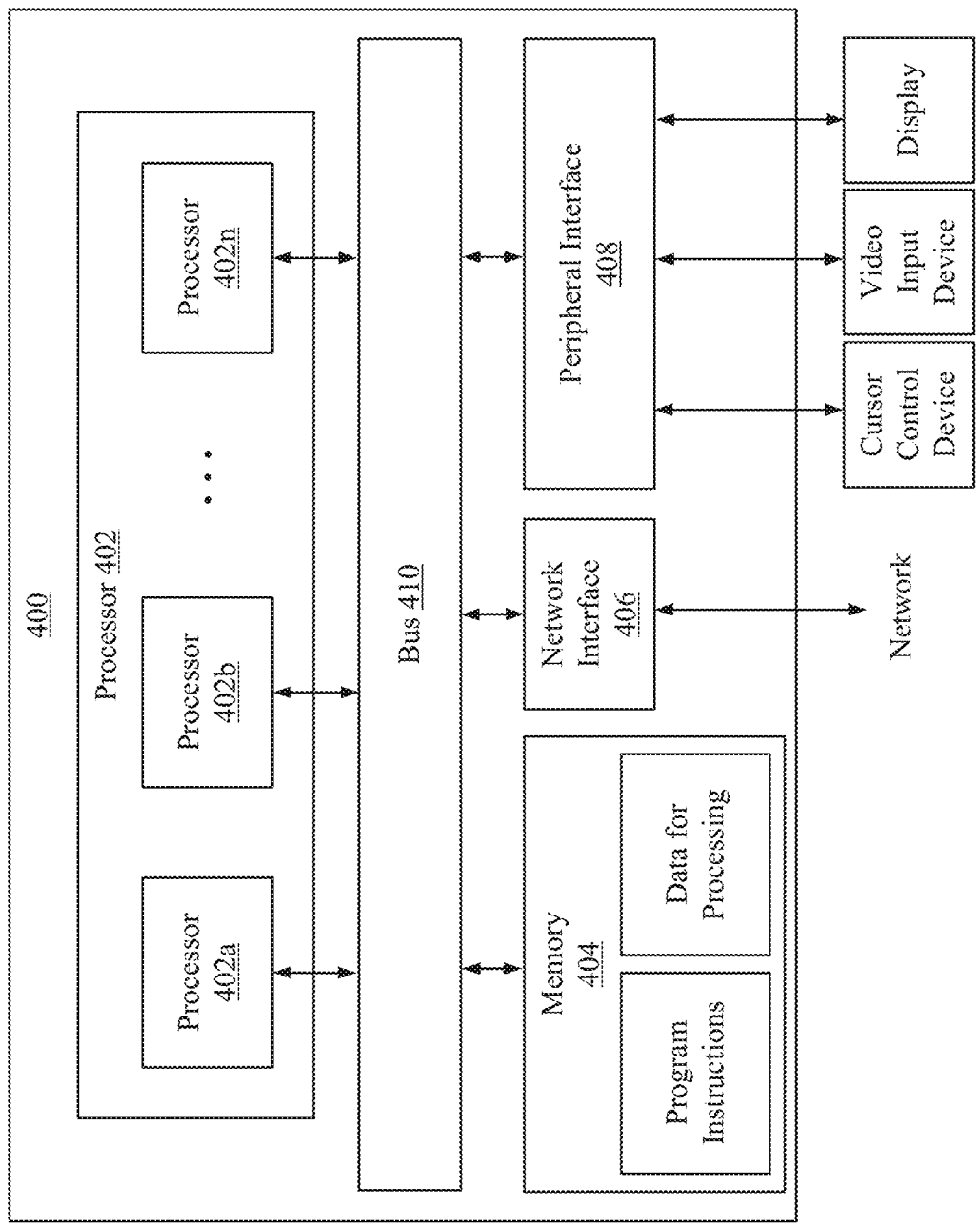
FIG. 4 illustrates a block diagram of an exemplary apparatus for encoding or decoding a video, according to some embodiments of the present disclosure.

FIG. 4 is a block diagram of an exemplary apparatus 400 for encoding or decoding a video, according to some embodiments of the present disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in FIG. 2 or FIG. 3) and data for processing. Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in the present disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs can be implemented as any combination of any software or hardware modules in apparatus 400. For example, some or all stages of encoder 200 of FIG. 2 or decoder 300 of FIG. 3 can be implemented as one or more software modules of apparatus 400, such as program instructions that can be loaded into memory 404. For another example, some or all stages of encoder 200 of FIG. 2 or decoder 300 of FIG. 3 can be implemented as one or more hardware modules of apparatus 400, such as a specialized data processing circuit (e.g., an FPGA, an ASIC, an NPU, or the like).

Figure 5:
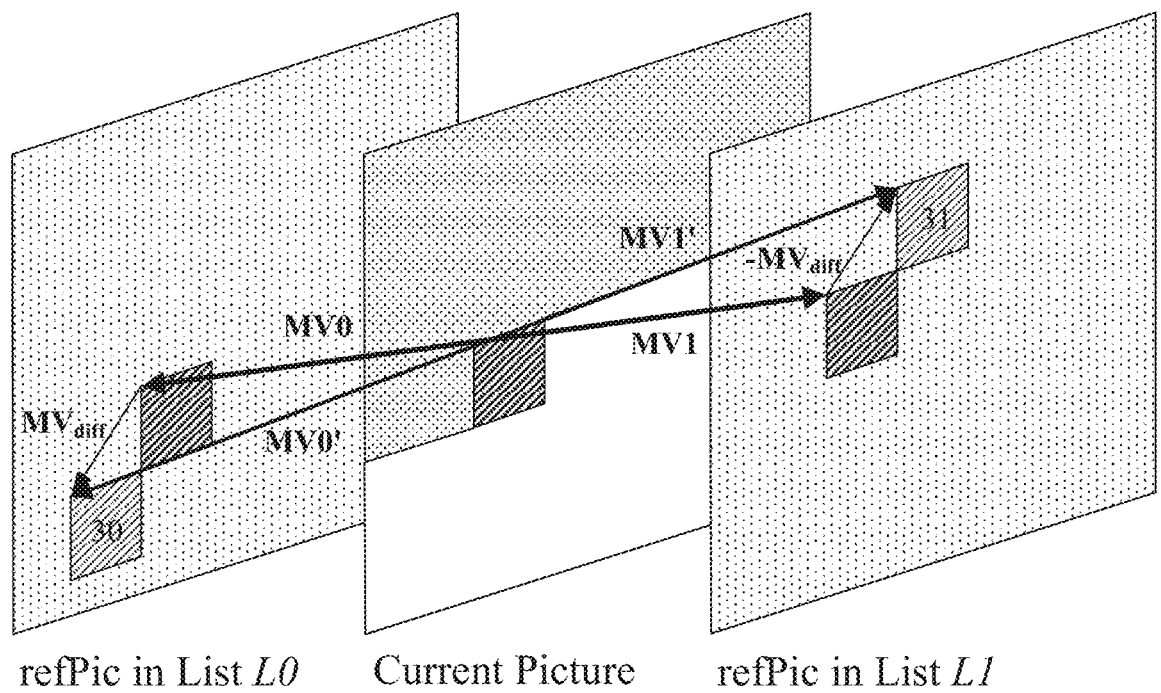
FIG. 5 is a schematic diagram illustrating an example of decoder side motion vector refinement (DMVR), according to some embodiments of the present disclosure.

In order to increase the accuracy of the motion vectors (MVs) of the merge mode, a bilateral-matching (BM) based decoder side motion vector refinement is adopted in Versatile Video Coding (VVC) draft 5. In bi-prediction operation, a refined MV is searched around the initial MVs in the reference picture list L0 and reference picture list L1. The BM method calculates the distortion between the two candidate blocks in the reference picture list L0 and list L1. FIG. 5 illustrates an example of DMVR 500, according to some embodiments of the present disclosure. As illustrated in FIG. 5, a sum of absolute difference (SAD) between blocks 30 and 31 based on each MV candidate around the initial MV is calculated. The MV candidate with the lowest SAD becomes the refined MV and is used to generate the bi-predicted signal.

In VVC draft 5, the DMVR is applied to the CUs which satisfy all of the following conditions:

CU level merge mode with bi-prediction MV or combined inter and intra prediction mode (in this case DMVR is applied to the inter part of the CIIP mode)

The block is predicted using bi-prediction motion vector with equal weights. Therefore, bi-prediction with weighted averaging (BWA) is not applied to the block One reference picture is in the past and another reference picture is in the future with respect to the current picture The distances (e.g., picture order count (POC) difference) from both reference pictures to the current picture are same The block has larger than or equal to 128 luma samples and the block width and height are both larger than or equal to 8 luma samples The refined MV derived by DMVR process is used to generate the inter prediction samples and also used in temporal motion vector prediction for future pictures coding. While the original MV is used in deblocking process and also used in spatial motion vector prediction for future CU coding within the current picture.

The additional features of VVC draft 5 DMVR are mentioned in the following description.

As shown in FIG. 5, the search points surround the initial MV and the MV offset obey the MV difference mirroring rule. In other words, any points that are checked by DMVR, denoted by candidate MV pair (MV0, MV1) obey the following two equations:

$$MV0'=MV0+MV\_offset \quad \text{Eq. (1)}$$

$$MV1'=MV1-MV\_offset \quad \text{Eq. (2)}$$

where MV_offset represents the refinement offset between the initial MV and the refined MVs. Note that MV_offset is a vector with motion displacements in the X and Y dimensions. In VVC draft 5, the refinement search range is two integer luma samples from the initial MV in both horizontal and vertical dimensions.

Figure 6:
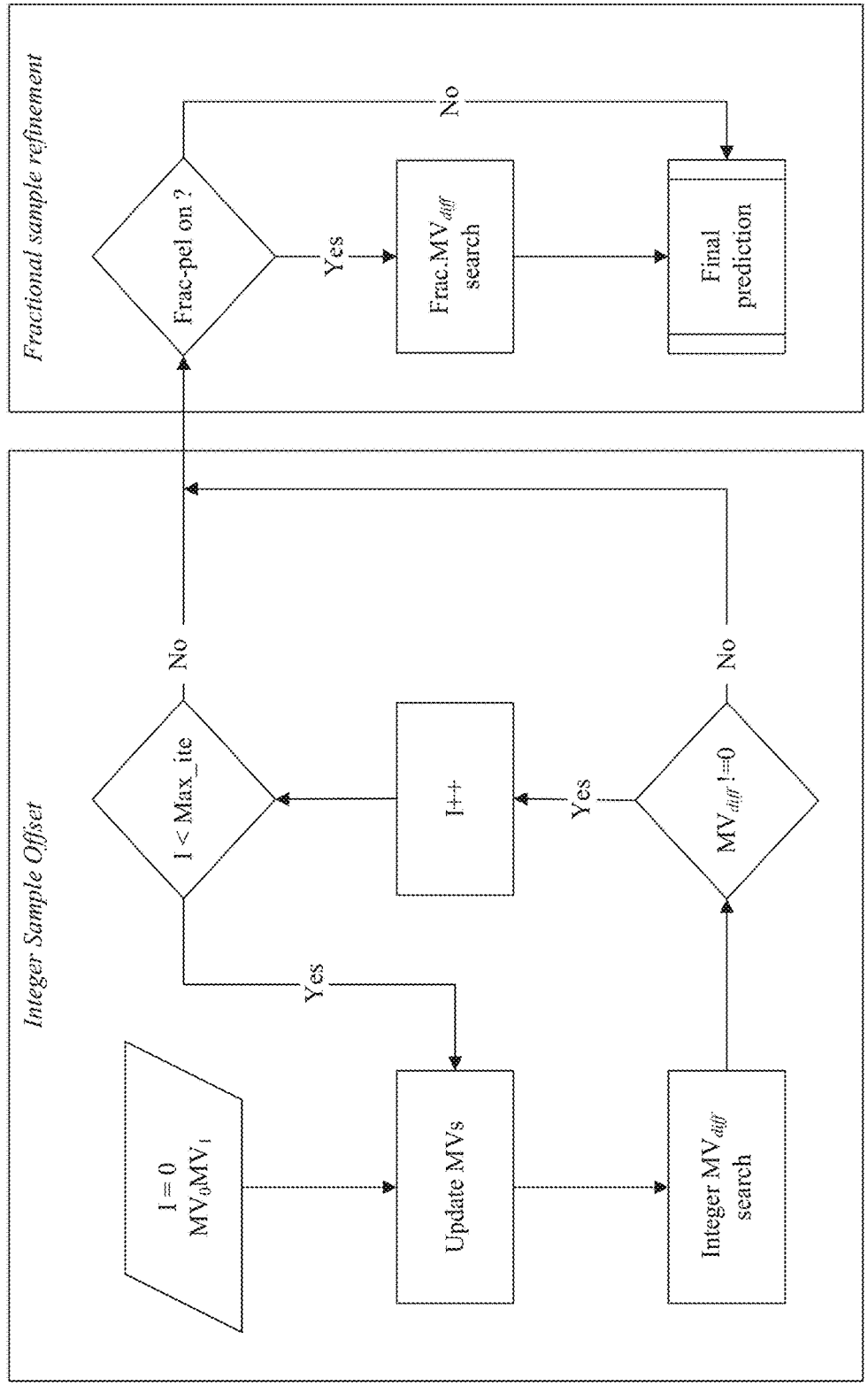
FIG. 6 is a schematic diagram illustrating an exemplary DMVR searching procedure, according to some embodiments of the present disclosure.

FIG. 6 illustrates an exemplary DMVR searching procedure 600, according to some embodiments of the present disclosure. This procedure 600 is an example of the searching process of DMVR in VVC draft 4. As shown in FIG. 6, the searching procedure 600 includes the integer sample offset search stage and fractional sample refinement stage. To reduce the search complexity, a fast searching method with early termination mechanism can be applied in the integer sample offset search stage. Instead of 25 points full search, a 2-iteration search scheme is applied to reduce the SAD check points. FIG. 7 illustrates an example of DMVR integer luma sample searching pattern 700, according to some embodiments of the present disclosure. As shown in FIG. 7, a maximum of 6 SADs are checked in the first iteration. First the SAD of the five points (Center and P1~P4) are compared. If the SAD of the center position is smallest, the integer sample stage of DMVR is terminated. Otherwise one more position P5 (determined by the SAD distribution of P1~P4), is checked. Then the position (among P1~P5) with smallest SAD is selected as center position of the second iteration search. The process of the second iteration search is similar to that of the first iteration search. The SAD calculated in the first iteration can be re-used in the second iteration, therefore only SAD of 3 additional points needs to be further calculated.

Figure 8:
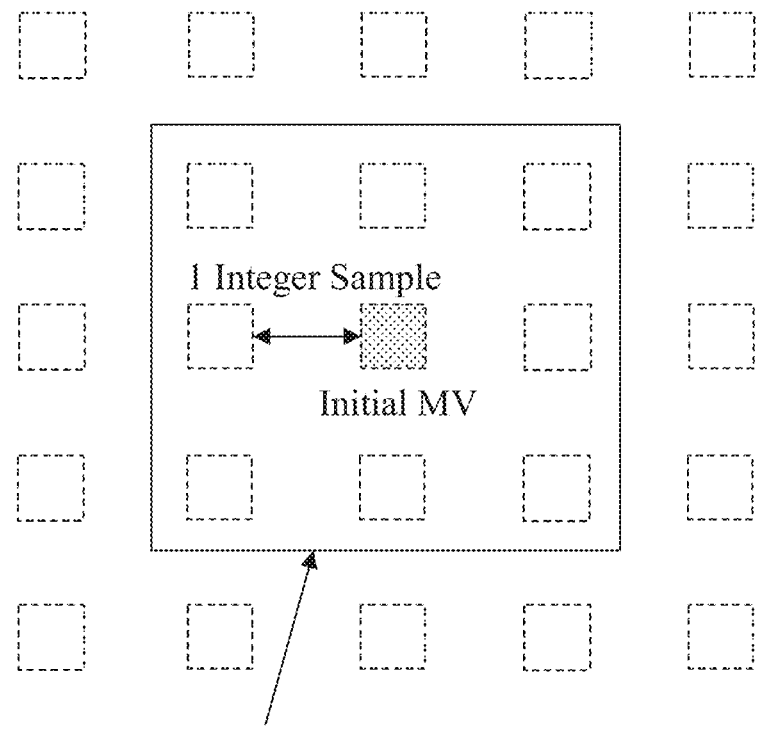
FIG. 8 is a schematic diagram illustrating exemplary DMVR integer sample offset search stage, according to some embodiments of the present disclosure.

In VVC draft 5, 2 steps search is removed. Then, in the integer sample search stage, all the SAD of 25 points are calculated, as shown in FIG. 8. Then the position with smallest SAD may be further refined in fractional sample refinement stage. The fractional sample refinement is conditionally invoked based on the position with smallest SAD. If the position is one of nine points around initial MV, the fractional sample refinement is further applied, and the refined MV is the output of this searching process. Otherwise, the position with smallest SAD is directly used as the output of this searching process.

The integer sample search can be followed by fractional sample refinement. To save computational complexity, the fractional sample refinement can be derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied in VVC draft 4.

Figure 9:
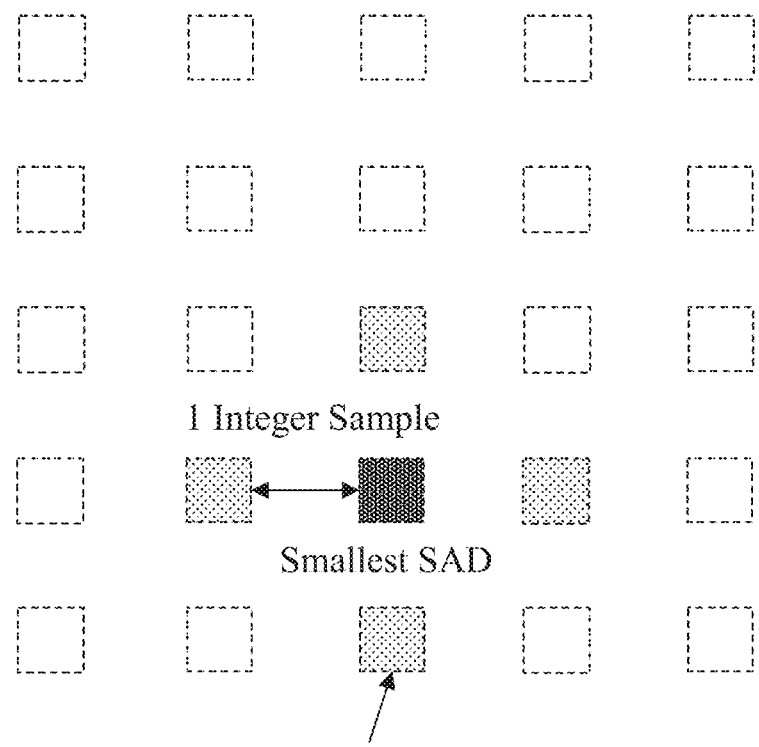
FIG. 9 is a schematic diagram illustrating exemplary DMVR parametric error surface estimation, according to some embodiments of the present disclosure.

FIG. 9 is a schematic diagram illustrating exemplary DMVR parametric error surface estimation 900, according to some embodiments of the present disclosure. In parametric error surface based sub-pixel offsets estimation, as shown in FIG. 9, the center position cost and the costs at four neighboring positions from the center are used to fit a 2-D parabolic error surface equation of the following form $$E(x,y) = ((A(x-x_{min})^2 B(y-y_{min})^2+) >> mvShift) + E(0,0) \quad \text{Eq. (3)}$$

where $(x_{min}, y_{min})$ corresponds to the fractional position with the least cost and E (x, y) corresponds to the cost of center and four neighboring positions, mvShift is set to 4 in VVC draft 5 (in VVC draft 5, MV accuracy is ¹⁄₁₆-pel), and the value A and B are set as follows:

$$A = \frac{E(-1,0) + E(1,0) - 2E(0,0)}{2} \quad \text{Eq. (4)}$$

$$B = \frac{E(0,-1) + E(0,1) - 2E(0,0)}{2} \quad \text{Eq. (5)}$$

By solving the above equations by using the cost value of the five search points, the $(x_{min}, y_{min})$ is computed as:

$$x_{min} = ((E(-1,0) - E(1,0)) << mvShift)/(2(E(-1,0) + E(1,0) - 2E(0,0))) \quad \text{Eq. (6)}$$

$$y_{min} = ((E(0,-1) - E(0,1)) << mvShift)/(2((E(0,-1) + E(0,1) - 2E(0,0))) \quad \text{Eq. (7)}$$

The values of $x_{min}$ and $y_{min}$ are automatically constrained to be between −8 and 8 (in ¹⁄₁₆ sample precision) since all cost values are positive and the smallest value is E(0,0). This corresponds to half-pel offset with ¹⁄₁₆th-pel MV accuracy in VVC draft 5. The computed fractional $(x_{min}, y_{min})$ are added to the integer distance refinement MV to get the refinement MV with sub-pel accuracy.

In VVC, the resolution of the MVs is ¹⁄₁₆ luma samples. The samples at the fractional position are interpolated using an 8-tap interpolation filter. In DMVR, the search points surround the initial MV with integer sample offset. Since the initial MV may have fractional-pel accuracy, the samples of those fractional position need to be interpolated for DMVR search process. To reduce the computation complexity, the bilinear interpolation filter is used to generate the fractional samples for the searching process in DMVR. Another important effect is that by using bilinear filter is that with 2-sample search range, the DMVR does not access more reference samples compared to the normal motion compensation process. After the refined MV is obtained with DMVR search process, the normal 8-tap interpolation filter is applied to generate the final prediction. In order to not access more reference samples than normal MC process, any samples not needed for the interpolation process based on the original MV but needed for the interpolation process based on the refined MV can be padded from those available samples.

When a CU is larger than 16 luma samples in either dimension, it can be further split into sub-blocks with width and/or height equal to 16 luma samples. If a CU is 16×8 and 8×16 luma samples in size, no further splitting is performed. This guarantees that the maximum unit size for DMVR searching process is limited to 16×16.

The bi-directional optical flow (BDOF) tool is included in VVC draft 5. BDOF, previously referred to as BIO, was included in the JEM software. Compared to the JEM version, the BDOF in VVC draft 5 is a simpler version that requires much less computation, especially in terms of number of multiplications and the size of the multiplier.

BDOF is used to refine the bi-prediction signal of a CU at the 4×4 sub-block level. BDOF is applied to a CU if it satisfies the following conditions: 1) the CU's height is not 4, and the CU is not in size of 4×8, 2) the CU is not coded using affine mode or the ATMVP merge mode; 3) the CU is coded using "true" bi-prediction mode, where one of the two reference pictures is prior to the current picture in display order and the other is after the current picture in display order. BDOF is applied to the luma component.

As its name indicates, the BDOF mode is based on the optical flow concept, which assumes that the motion of an object is smooth. For each 4×4 sub-block, a motion refinement $(v_x, v_y)$ is calculated by minimizing the difference between the L0 and L1 prediction samples. The motion refinement is then used to adjust the bi-predicted sample values in the 4×4 sub-block. The following steps are applied in the BDOF process.

First, the horizontal and vertical gradients, $$\frac{\partial I^{(k)}}{\partial x}(i,j) \text{ and } \frac{\partial I^{(k)}}{\partial y}(i,j), k = 0, 1,$$

of the two prediction signals are computed by directly calculating the difference between two neighboring samples, $$\frac{\partial I^{(k)}}{\partial x}(i,j) = (I^{(k)}(i+1,j) - I^{(k)}(i-1,j)) \gg shift1 \quad \text{Eq. (8)}$$

$$\frac{\partial I^{(k)}}{\partial y}(i,j) = (I^{(k)}(i,j+1) - I^{(k)}(i,j-1)) \gg shift1 \quad \text{Eq. (9)}$$

where $I^{(k)}(i,j)$ are the sample value at coordinate (i,j) of the prediction signal in list k, k=0,1, and shift1 is calculated based on the luma bit depth, bitDepth, as shift1=max(2, 14−bitDepth).

Then, the auto- and cross-correlation of the gradients, $S_1$, $S_2$, $S_3$, $S_5$ and $S_6$, are calculated as $$S_1 = \sum_{(i,j)\in\Omega} \psi_x(i,j) \cdot \psi_x(i,j) \quad \text{Eq. (10)}$$

$$S_2 = \sum_{(i,j)\in\Omega} \psi_x(i,j) \cdot \psi_y(i,j) \quad \text{Eq. (11)}$$

$$S_3 = \sum_{(i,j)\in\Omega} \theta(i,j) \cdot \psi_x(i,j) \quad \text{Eq. (12)}$$

$$S_5 = \sum_{(i,j)\in\Omega} \psi_y(i,j) \cdot \psi_y(i,j) \quad \text{Eq. (13)}$$

$$S_6 = \sum_{(i,j)\in\Omega} \theta(i,j) \cdot \psi_y(i,j) \quad \text{Eq. (14)}$$

$$\psi_x(i,j) = \left(\frac{\partial I^{(1)}}{\partial x}(i,j) + \frac{\partial I^{(0)}}{\partial x}(i,j)\right) \gg n_a \quad \text{Eq. (15)}$$

$$\psi_y(i,j) = \left(\frac{\partial I^{(1)}}{\partial y}(i,j) + \frac{\partial I^{(0)}}{\partial y}(i,j)\right) \gg n_a \quad \text{Eq. (16)}$$

$$\theta(i,j) = (I^{(1)}(i,j) \gg n_b) - (I^{(0)}(i,j) \gg n_b) \quad \text{Eq. (17)}$$

where Ω is a 6×6 window around the 4×4 sub-block, and the values of $n_a$ and $n_b$ are set equal to min(5, bitDepth−7) and min(8, bitDepth−4), respectively.

The motion refinement $(v_x, v_y)$ is then derived using the cross- and auto-correlation terms using the following:

$$v_x = S_1 > 0 ? \; clip3(-th'_{BIO}, th'_{BIO}, -((S_3 \cdot 2^{n_b-n_a}) \gg \lfloor \log_2 S_1 \rfloor)):0 \quad \text{Eq. (18)}$$

$$v_y = S_5 > 0 ? \; clip3(-th'_{BIO}, \quad \text{(19)}$$

$$th'_{BIO}, -((S_6 \cdot 2^{n_b-n_a} - ((v_x S_{2,m}) \ll n_{S_2} + v_x S_{2,s})/2) \gg \lfloor \log_2 S_5 \rfloor)):0$$

where $S_{2,m} = S_2 \gg n_{S_2}$, $S_{2,s} = S_2 \, \& (2^{n_{S_2}} - 1)$, $$th'_{BIO} = 2^{13-BD}. \lfloor \cdot \rfloor \text{ is the floor function, and } n_{S_2} = 12.$$

Based on the motion refinement and the gradients, the following adjustment is calculated for each sample in the 4×4 sub-block:

$$b(x, y) = rnd\left(\left(v_x\left(\frac{\partial I^{(1)}(x, y)}{\partial x} - \frac{\partial I^{(0)}(x, y)}{\partial x}\right)\right)/2\right) + \quad \text{Eq. (20)}$$

$$rnd\left(\left(v_y\left(\frac{\partial I^{(1)}(x, y)}{\partial y} - \frac{\partial I^{(0)}(x, y)}{\partial y}\right)\right)/2\right)$$

Finally, the BDOF samples of the CU are calculated by adjusting the bi-prediction samples as follows:

$$\text{pred}_{BDOF}(x,y) = )(I^{(0)}(x,y) + I^{(1)}(x,y) + b(x,y) + o_{offset})$$
$$\gg \text{shift} \quad \text{Eq. (21)}$$

These values are selected such that the multipliers in the BDOF process do not exceed 15-bit, and the maximum bit-width of the intermediate parameters in the BDOF process is kept within 32-bit.

Figure 10:
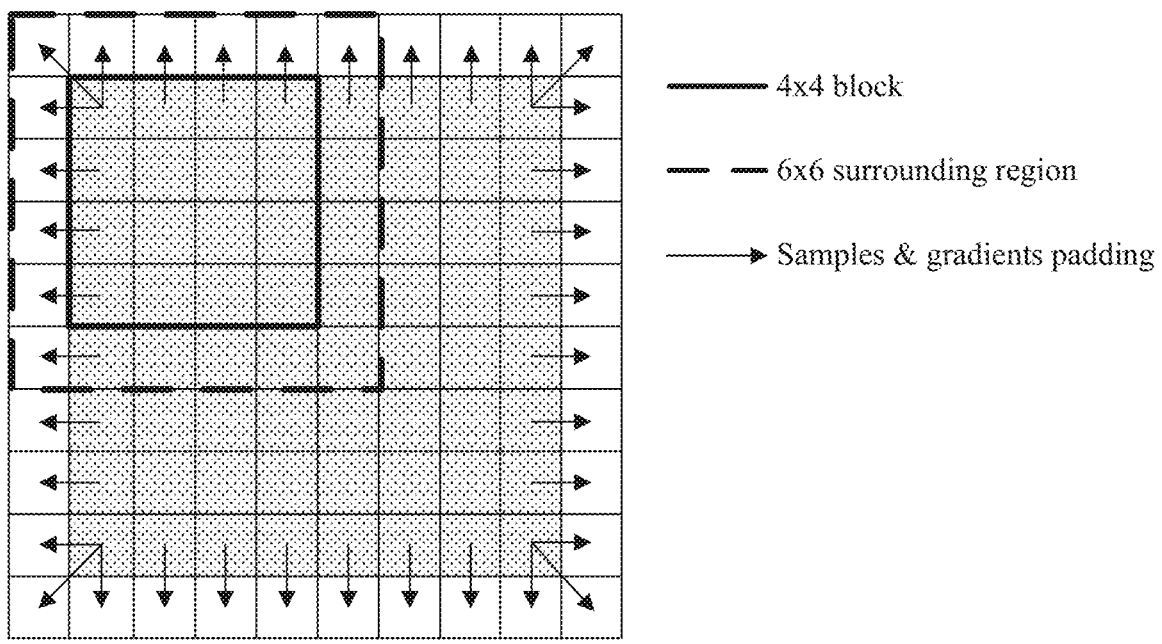
FIG. 10 is a schematic diagram of an example of extended coding unit (CU) region used in bi-directional optical flow (BDOF), according to some embodiments of the present disclosure.

In order to derive the gradient values, some prediction samples $I^{(k)}(i,j)$ in list k (k=0,1) outside of the current CU boundaries need to be generated. FIG. 10 is a schematic diagram of an example of extended coding-unit (CU) region 1000 used in BDOF, according to some embodiments of the present disclosure. As depicted in FIG. 10, the BDOF in VVC draft 5 uses one extended row/column around the CU's boundaries. In order to control the computational complexity of generating the out-of-boundary prediction samples, prediction samples in the extended area (white positions) are generated by taking the reference samples at the nearby integer positions (using floor( ) operation on the coordinates) directly without interpolation, and the normal 8-tap motion compensation interpolation filter is used to generate prediction samples within the CU (gray positions). These extended sample values are used in gradient calculation only. For the remaining steps in the BDOF process, if any sample and gradient values outside of the CU boundaries are needed, they are padded (or repeated) from their nearest neighbors. To reduce the computation of the BDOF, an early termination is adopted in VVC. When the SAD of two predictors (or predicted blocks) is less than a threshold, the BDOF is skipped.

Problems exist with the current design of motion vector refinement. For example, in the MV refinement search stage, the MV pair by which the two predictors are referenced having the minimum sum of absolute difference (SAD) is obtained as the refined motion vector for the following decoding process. After motion compensated prediction (using the MV pair obtained from DMVR), the residuals between the predictor block and the original block are computed, transformed and quantized before being entropy coded. To reduce the signaling overhead, the transformed/quantized residual coefficients should be as small as possible. Minimizing the SAD of two predictors used in current design of DMVR in VVC doesn't guarantee the transformed/quantized residual coefficients are minimized. This design may be problematic in some cases.

For example, in some homogenous areas, the SAD of two predictors may be very large if the two predictors are just off by a constant value, but any such difference is easily compressed after transform is applied because such difference can show up only as the direct current (DC) component in the frequency domain.

On the contrary, in some complex areas, if the differences vary in signs (positive and negative) quickly sample by sample, the SAD may be small, but the transformed and quantized residuals may have lots of high frequency information that are difficult to compress.

Therefore, using SAD as a criterion to choose the refined MV is not an optimal solution to obtaining a truly better MV for inter prediction. Accordingly, in some exemplary embodiments consistent with the present disclosure, a sum of absolute transformed difference (SATD), instead of SAD, is used as the criterion during MV refinement, for example, during DMVR's MV refinement process.

In some embodiments, in MV search process, SATD associated with each MV check point (or search point) is calculated and final refined MV is obtained, at least in part, by minimizing the SATD. Any MV search process and MV search pattern can be used, including, but not limited to, existing MV search pattern/process in VVC drafts, or other search patterns/processes.

In some embodiments, SATD of integer check points are calculated and the check point with the minimum SATD is chosen as the best integer point and fractional refinement is further conducted to get the final refined MV. In SATD calculation, for a N×M DMVR block (e.g., coding block), a N×M difference block of two predicted blocks is calculated and a N×M 2D transform (N×N in a first dimension and M×M in a second dimension) is applied on the N×M difference block, and then sum of the N×M absolute transformed coefficients are calculated as the SATD of this check point. In this disclosure, N×M may be 16×8, 8×16, 16×16 or other sizes used in DMVR process. It is appreciated that the transform may be any suitable transform for obtaining the SATD. In an embodiment, the transform may be Hadamard transform. In another embodiment, the transform may be discrete cosine transform (DCT) or discrete sine transform (DST).

Although applying a transform on difference block before getting the sum improve the accuracy of the coding cost assessment, it may increase the complexity of implementation in terms of both computation and latency. Thus, in some embodiments, other simplification methods may be utilized. These methods can reduce the implementation of SATD calculation.

In some embodiments, block downsampling is performed before or after transform. The block downsampling can be performed on DMVR block (e.g., coding blocks) or difference block.

Figure 11:
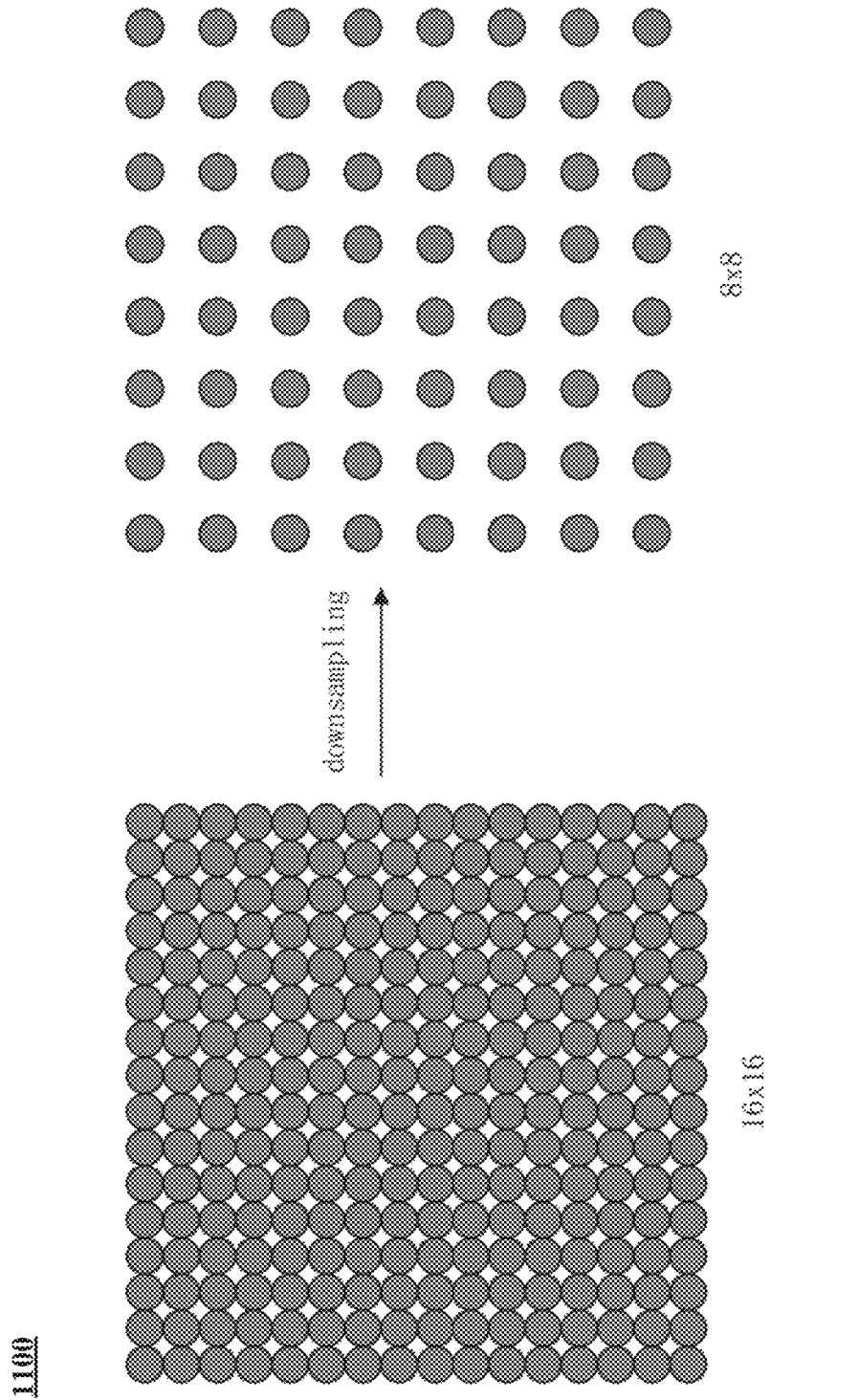
FIG. 11 is a schematic diagram illustrating an exemplary 2 to 1 downsampling on both dimensions, according to some embodiments of the present disclosure.

In an example, a k-to-1 downsampling is performed on both dimensions. For example, a 16×16 block is downsampled to a (16/k)×(16/k) block; a 16×8 block is downsampled to a (16/k)×(8/k) block; an 8×16 block is downsampled to a (8/k)×(16/k) block. In an embodiment, to reduce the downsampling complexity, interpolation filter may not be used. Instead, one of every k pixels is picked as a simple k to 1 downsampling method. Although k-to-1 downsampling is taken as an example, it is appreciated that this disclosure doesn't have special restriction on downsampling ratio. Generally, a k-to-x downsampling can be used. In some embodiments, k may be power of 2. For example, k is 2, then a 16×16 block is downsampled to an 8×8 block; a 16×8 block is downsampled to an 8×4 block; an 8×16 block is downsampled to a 4×8 block. FIG. 11 illustrates an exemplary 2-to-1 downsampling 1100 on both dimensions, according to some embodiments of the present disclosure. As shown in FIG. 11, a 2-to-1 downsampling 1100 is applied on a 16×16 block to get an 8×8 block.

In another example, the downsampling ratio may be different in the two dimensions. For example, a k-to-1 downsampling is performed in horizontal direction and a t to 1 downsampling is performed in vertical direction. Then a 16×16 block is downsampled to a (16/k)×(16/t) block; a 16×8 block is downsampled to a (16/k)×(8/t) block; a 8×16 block is downsampled to a (8/k)×(16/t) block.

Figure 12:
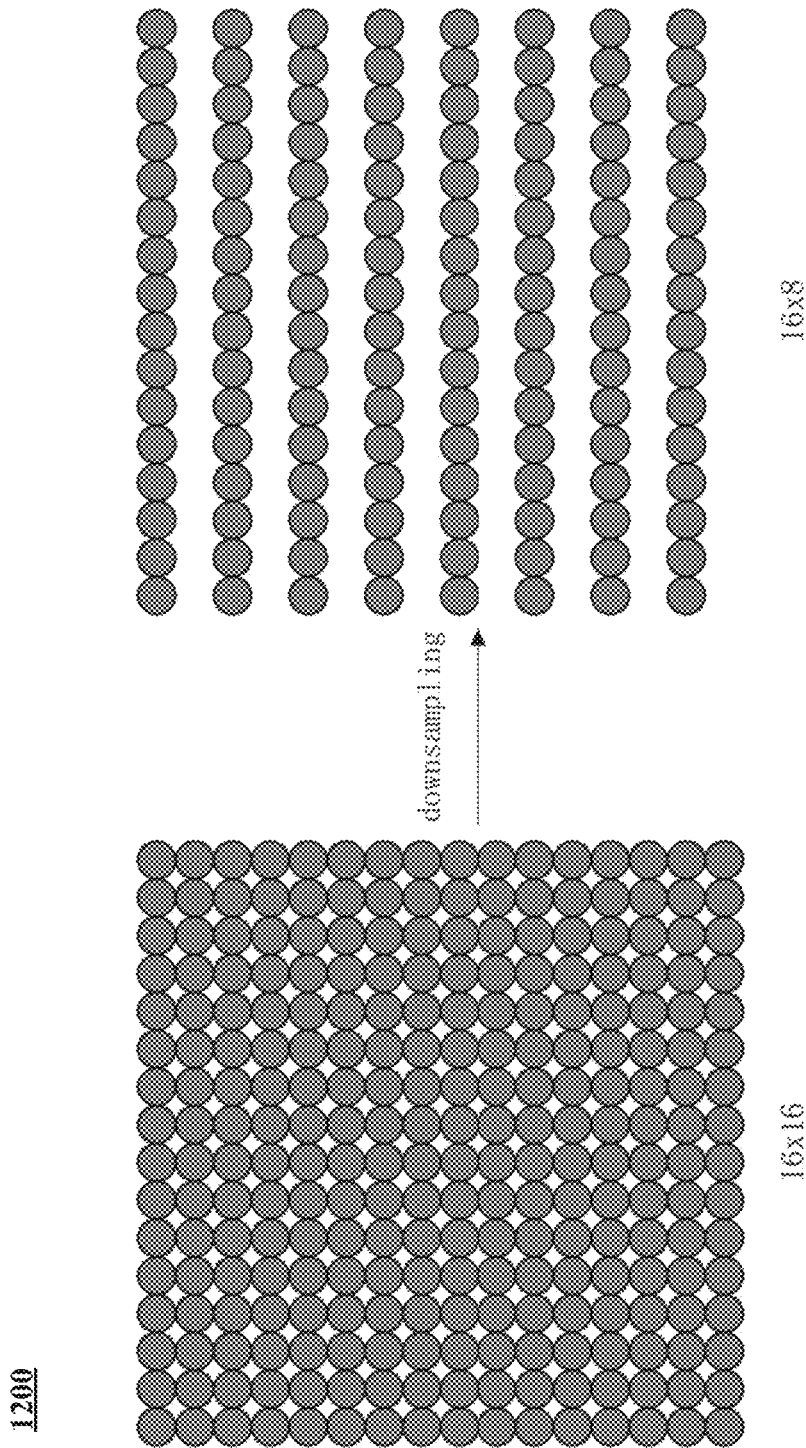
FIG. 12 is a schematic diagram illustrating an exemplary 2 to 1 downsampling on vertical direction, according to some embodiments of the present disclosure.

In another example, the downsampling is only performed in the vertical direction. For example, a k-to-1 downsampling is performed in vertical direction. Then a 16×16 block is downsampled to a 16×(16/k); a 16×8 block is downsampled to a 16×(8/k) block; an 8×16 block is downsampled to an 8×(16/k) block. In some embodiments, k is the power of 2. For example, k is 2, then a 16×16 block is downsampled to a 16×8 block; a 16×8 block is downsampled to a 16×4 block; an 8×16 block is downsampled to an 8×8 block. FIG. 12 is a schematic diagram illustrating an exemplary 2 to 1 downsampling 1200 on vertical direction, according to some embodiments of the present disclosure. The 2-to-1 downsampling 1200 is performed in the vertical direction on a 16×16 block to get a 16×8 block. Generally, performing downsampled only in vertical direction is beneficial to Single Instruction Multiple Data (SIMD) optimization.

In yet another example, whether downsampling is performed depends on the size of DMVR block. For example, a 16×16 block is downsampled to a 16×8 block before transform. A 16×8 block or an 8×16 block is not downsampled. In some embodiments, a threshold may be defined. For blocks larger than threshold, downsampling is performed and for blocks smaller than threshold, downsampling is not performed.

After downsampling, a (N/k)×(M/t) 2D transform is performed to calculate the SATD. Then, the complexity of transform is reduced.

In some embodiments, block splitting is performed before transform. The block splitting can be performed on DMVR block (e.g., coding blocks) or difference block.

In an example, a N×M block is split into K×K sub-blocks and the K×K Hadamard transform (or another type of transform) is performed on the each of K×K sub-block. For example, K may be 8, 4 or 2. Then, a 16×16 block is split into four 8×8 sub-blocks, sixteen 4×4 or 64 2×2 sub-blocks, respectively; a 16×8 block is split into two 8×8 sub-blocks, eight 4×4 blocks or thirty-two 2×2 sub-blocks; an 8×16 block is split into two 8×8 sub-blocks, eight 4×4 sub-blocks or thirty-two 2×2 sub-blocks. In this example, regardless the size of original DMVR block, all the blocks are spilt into sub-blocks of the same size. FIG. 13 illustrates examples of splitting DMVR block into 4×4 sub-blocks, according to some embodiments of the present disclosure. For example, as shown in FIG. 13, a 16×16 block is split into sixteen 4×4 sub-block, a 16×8 block is split into eight 4×4 sub-blocks and an 8×16 block is split into eight 4×4 sub-blocks. Then, only one size of transform core is needed, which reduces the DMVR hardware implementation cost.

Figure 14:
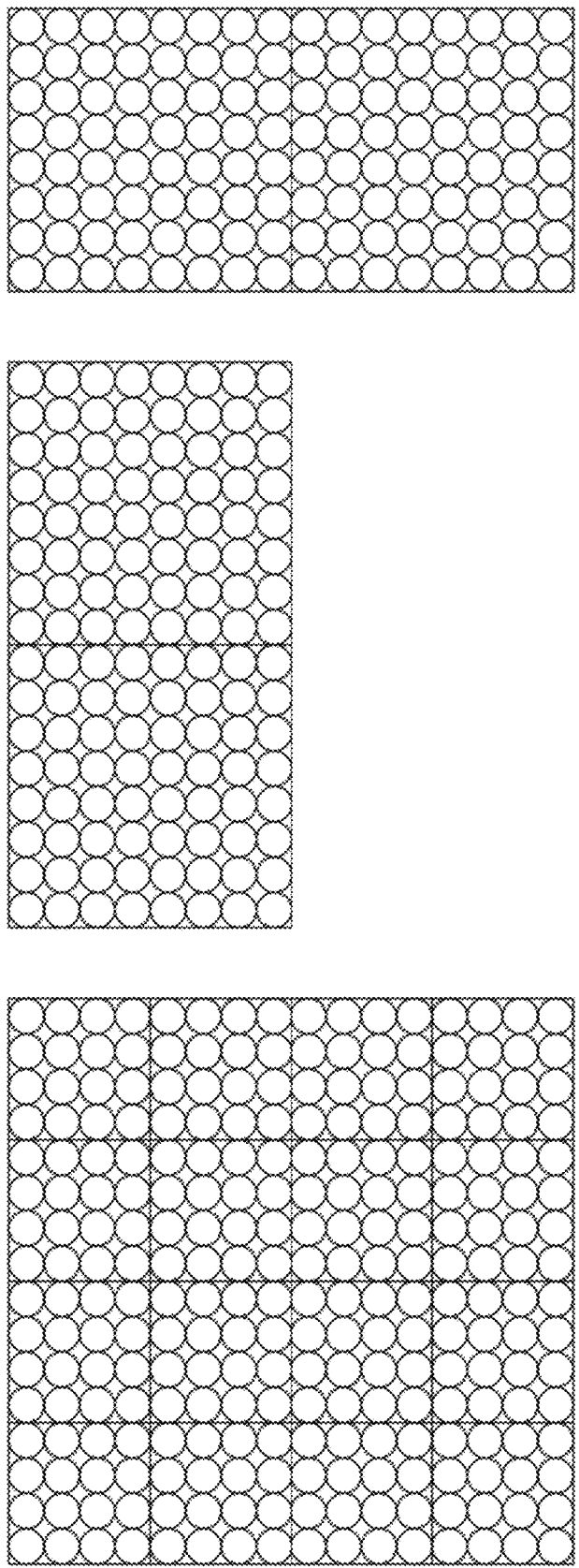
FIG. 14 is a schematic diagram illustrating examples of splitting DMVR block into sub-blocks with different sizes, according to some embodiments of the present disclosure.

In another example, depending on the size of original DMVR block, the DMVR blocks are split into sub-blocks with different sizes. FIG. 14 is a schematic diagram illustrating examples of splitting DMVR block into sub-blocks with different sizes, according to some embodiments of the present disclosure. For example, a 16×16 block is split into sixteen 4×4 sub-blocks; a 16×8 block is split into two 8×8 sub-blocks; an 8×16 block is split into two 8×8 sub-blocks shown as in FIG. 14.

Alternatively, block splitting may or may not be performed depending on the size of DMVR block. For example, a 16×16 block is split into two 16×8 sub-blocks, two 8×16 sub-blocks, or four 8×8 sub-blocks; a 16×8 block is not split and treated as a 16×8 sub-block; an 8×16 block is not split and treated as an 8×16 sub-block. FIG. 15 is a schematic diagram illustrating examples of splitting DMVR block or not dependent on DMVR block size, according to some embodiments of the present disclosure. In FIG. 15, a 16×16 block is split into four 8×8 sub-blocks and a 16×8 or 8×16 block is not split. In this embodiment, only large blocks are split to reduce the worst case of computational complexity, and small blocks are not split in order to maintain the coding efficiency for these blocks.

Splitting the large block into sub-blocks reduces the computational complexity when calculating SATD, but it also reduces the coding efficiency. In some embodiments, secondary transform is applied. Then, the secondary transform can improve the coding efficiency while maintaining relative low complexity.

Figure 16:
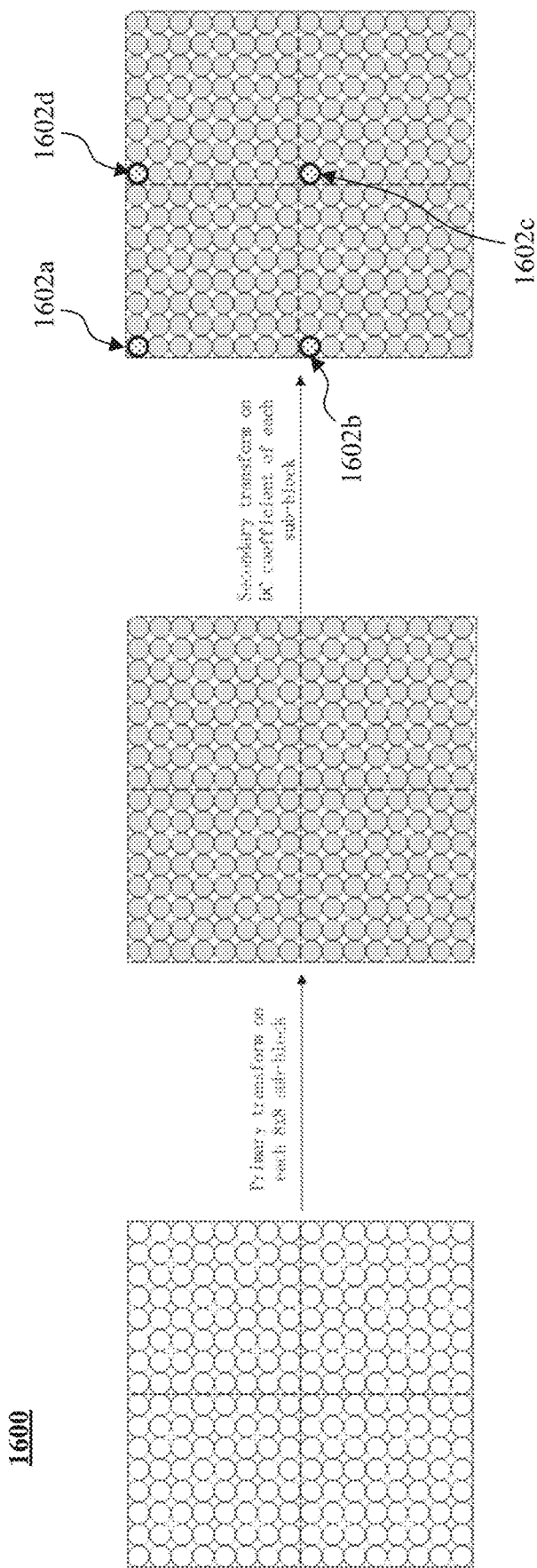
FIG. 16 is a schematic diagram illustrating an exemplary secondary transform, according to some embodiments of the present disclosure.

In some embodiments, an N×M block is split into multiple sub-blocks. The splitting method includes, but is not limited to, those described in the present disclosure. For example, a N×M block is split into (N/K)×(M/T) sub-blocks and a (N/K)×(M/T) 2D transform (e.g., Hadamard transform or other transforms) is performed on each of the sub-blocks. After transform, the direct current (DC) coefficient (e.g., top-left coefficient in the case of Hadamard transform) of each sub-block is picked up to form a K×T block. Then a secondary transform is performed on the K×T block and the secondary transformed coefficients are put back to DC position (e.g., the top-left position) of each (N/K)×(M/T) sub-block. Finally, the absolute values of N×M coefficients are summed up to get the SATD. For example, FIG. 16 is a schematic diagram illustrating an exemplary secondary transform 1600, according to some embodiments of the present disclosure. In FIG. 16, light gray positions indicate the coefficients after primary transform and the highlighted positions 1602a, 1602b, 1602c, and 1602d (top-left positions of the sub-blocks) indicate the coefficients after secondary transform. A 16×16 block is split into four 8×8 sub-blocks and an 8×8 primary transform is performed on each 8×8 sub-block. Then a 2×2 secondary transform is performed on the DC coefficient of each sub-block. It is appreciated that only a portion of coefficients performs a secondary transform to make a trade-off between computation complexity and the coding efficiency. After primary transform, the DC coefficient (the top-left coefficient 1602a, 1602b, 1602c, and 1602d in the embodiment shown in FIG. 16) of the sub-block is obtained. Performing a secondary transform on DC coefficients of the sub-blocks reduces correlation among the sub-blocks and improve the coding efficiency. It is appreciated that the secondary transform may be the same as or different from the primary transform.

In some embodiments, whether a secondary transform is performed depends on the size of the block (e.g., DMVR block or difference block). For example, a 16×16 block is split into sixteen 4×4 sub-blocks. After 4×4 primary transform, a 4×4 secondary transform is performed on the DC coefficient of each 4×4 sub-block. A 16×8 block is split into eight 4×4 sub-blocks or two 8×8 sub-blocks. Only 4×4 or 8×8 primary transform is performed, and no secondary transform is performed. An 8×16 block is split into eight 4×4 sub-blocks or two 8×8 sub-blocks. Only 4×4 or 8×8 primary transform is performed, and no secondary transform is performed. Because smaller blocks are generally the throughput bottleneck of hardware decoders, simplifying the DMVR process for smaller blocks may provide better complexity versus performance trade-off.

It is appreciated that embodiments of the present disclosure may be implemented individually or jointly. The joint condition may be dependent on the size of the block (e.g., DMVR block or difference block).

In some embodiments, the block is downsampled and split into small sub-blocks followed by small transforms. For example, a 2-to-1 vertical downsampling is performed to a 16×16 block to get a 16×8 block. And then 16×8 block is split into eight 4×4 sub-blocks and 4×4 transform is performed on each sub-block. For 16×8 and 8×16 block, the block is directly split into 4×4 sub-block without downsampling. Alternatively, the processes of downsampling and splitting are switchable.

In some embodiments, the block is split into sub-block and transform is performed. Then the downsampling is performed on transformed coefficients.

In some embodiments, the block is downsampled and split into small sub-blocks. After primary transform, a secondary transform is performed. For example, a 2-to-1 vertical downsampling is performed to a 16×16 block to get a 16×8 block. And then 16×8 block is split into eight 4×4 sub-blocks and 4×4 transform is performed on each sub-block. Then, a 4×2 2D secondary transform is performed on the DC coefficient of each sub-block before summing up all the coefficients. For 16×8 and 8×16 block, the block is also vertically downsampled into 16×4 and 8×8 blocks. And then, splitting 16×4 and 8×8 blocks into four 4×4 sub-blocks to perform transform. After primary transform, the absolute values of coefficients are summed up to get SATD without secondary transform.

FIG. 17 illustrates a flowchart of an exemplary method 1700 for motion vector refinement, according to some embodiments of the present disclosure. In some embodiments, method 1700 can be performed by a decoder (e.g., decoder 300 of FIG. 3) or performed by one or more software or hardware components of an apparatus (e.g., apparatus 400 of FIG. 4). For example, a processor (e.g., processor 402 of FIG. 4) can perform method 1700. In some embodiments, method 1700 can be implemented by a computer program product, embodied in a computer-readable medium, including computer-executable instructions, such as program code, executed by computers (e.g., apparatus 400 of FIG. 4).

At step 1702, method 1700 can include determining a plurality of first blocks associated with a first motion vector and a plurality of second blocks associated with a second motion vector. In some embodiments, the plurality of first blocks associated with the first motion vector can include an original first block on an original first position referred to by the first motion vector and at least one shifted first block on a position shifted from the original first position, and the plurality of second blocks associated with the second motion vector can include an original second block on an original second position referred to by the second motion vector and at least one shifted second block on a position shifted from the original second position. The plurality of first blocks and the plurality of second blocks can have any suitable search patterns, such as the patterns shown in FIGS. 7-9. The first motion vector and the second motion vector can be associated with a coding block in a CU.

At step 1704, method 1700 can include determining a SATD between one of the plurality of first blocks and one of the plurality of second blocks. In some embodiments, the SATD can be determined by generating a difference block between one of the plurality of first blocks and one of the plurality of second blocks, performing a transform on the difference block to generate a plurality of absolute transformed coefficients, and determining a sum of the plurality of absolute transformed coefficients, as the SATD associated with the one of the plurality of first blocks and the one of the plurality of second blocks. The transform can be a Hadamard transform, a DCT, a DST, or the like. The DMVR can be performed on the coding block.

In some embodiments, method 1700 can include performing downsampling on the difference block before the transform is performed on the difference block, or performing dowsampling on the one of the plurality of first blocks and the one of the plurality of second blocks, before generating the difference block. For example, the block downsampling can apply a first downsampling ratio to a first dimension of the block (e.g., difference block, first block or second block) and a second downsampling ratio to a second dimension of the block. The first downsampling ratio can be the same as or different from the second downsampling ratio. As another example, the block downsampling can be applied to only one dimension of the block. As a further example, before the transform is performed on the block, a size of the block can be determined. If the size of the block is larger than a predetermined threshold, the downsampling can be performed on the block. Otherwise, the downsampling is not performed.

In some embodiments, method 1700 can include splitting the difference block into a plurality of difference sub-blocks. A size of the sub-blocks can be dependent on a size of the difference block. The transform can be performed on the plurality of difference sub-blocks, to generate the plurality of absolute transformed coefficients.

In some embodiments, method 1700 can include a secondary transform. For example, method 1700 can include selecting a DC coefficient from the transformed coefficients of each of the plurality of difference sub-blocks to form a selected block, performing another transform on the selected block, placing elements in the transformed selected block back to the plurality of difference sub-blocks, and determining a sum of absolute values of coefficients of the plurality of difference sub-blocks, as the SATD. The another transform can be a Hadamard transform, a DCT, a DST, or the like.

In some embodiments, method 1700 can include splitting the one of the plurality of first blocks and the one of the plurality of second blocks into a plurality of first sub-blocks and a plurality of second sub-blocks, generating difference sub-blocks between each of the plurality of first sub-blocks and a corresponding second sub-block, and performing the transform on the difference sub-blocks, to generate the plurality of absolute transformed coefficients.

At step 1706, method 1700 can include refining the first motion vector and the second motion vector based on the determined SATDs. For example, a first block and a second block with a lowest SATD can be determined, and a refined MV can be determined based on the determined first block and second block with the lowest SATD. In some embodiments, a fractional sample refinement (e.g., the fractional sample refinement shown in FIG. 6, FIG. 8 or FIG. 9) can also be performed.

In some embodiments, for BDOF/DMVR, an early termination can be applied. SATD is used as a criterion for early termination. If the SATD of two predictors is less than a threshold, BDOF/DMVR is not applied. In some embodiments, CU may be split into multiple sub-blocks, and SATD of two predictors of each sub-block is used as a criterion to control BDOF/DVMR of each block.

Figure 18:
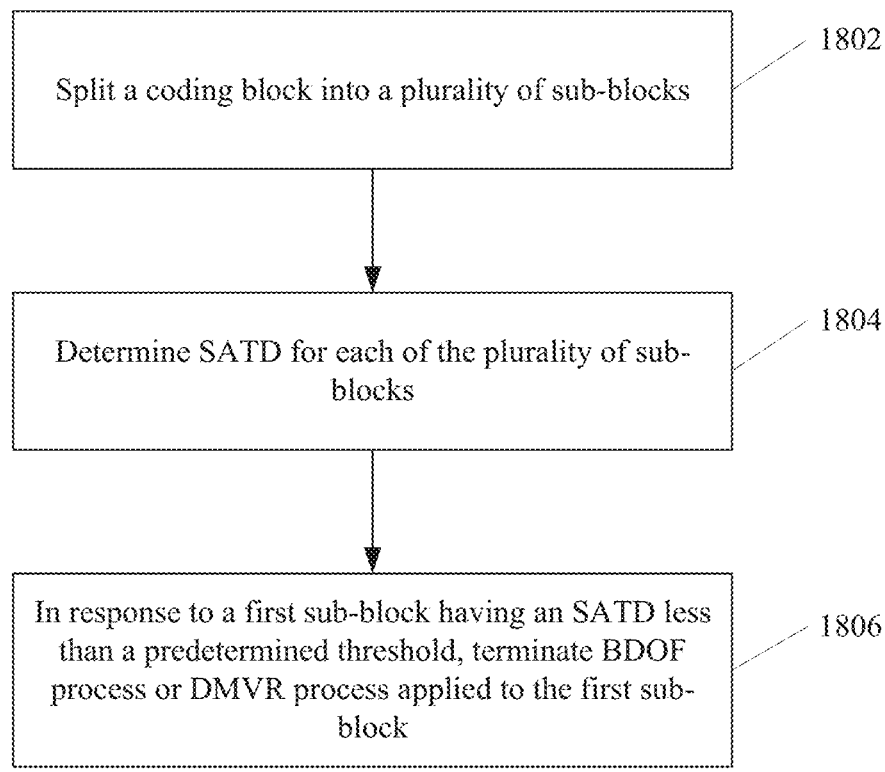
FIG. 18 illustrates a flowchart of an exemplary method for video data processing, according to some embodiments of the present disclosure

FIG. 18 illustrates a flowchart of an exemplary method 1800 for video data processing, according to some embodiments of the present disclosure. In some embodiments, method 1800 can be performed by a decoder (e.g., decoder 300 of FIG. 3) or performed by one or more software or hardware components of an apparatus (e.g., apparatus 400 of FIG. 4). For example, a processor (e.g., processor 402 of FIG. 4) can perform method 1800. In some embodiments, method 1800 can be implemented by a computer program product, embodied in a computer-readable medium, including computer-executable instructions, such as program code, executed by computers (e.g., apparatus 400 of FIG. 4).

At step 1802, method 1800 can include splitting a coding unit into a plurality of sub-blocks. Each sub-block can be associated with a plurality pairs of motion vectors. For example, FIG. 5 shows two pairs of motion vectors (MV0, MV1) and (MV0', MV1') associated a sub-block in current picture.

At step 1804, method 1800 can include determining a SATD for each of the plurality of sub-blocks. For example, for each sub-block, the SATD can be determined by determining two predicted blocks associated with a pair of motion vectors of the sub-block, respectively, determining a difference block of the two predicted blocks, performing a transform on the difference block to generate a plurality of absolute transformed coefficients, and determining a sum of the plurality of absolute transformed coefficients, as the SATD for the pair of motion vectors of the sub-block. The transform can be Hadamard transform, DCT, DST, or the like.

In some embodiments, method 1800 can include performing a block downsampling on the sub-block. For example, the block downsampling can apply a first downsampling ratio to a first dimension of the sub-block and a second downsampling ratio to a second dimension of the sub-block. The first downsampling ratio can be the same as or different from the second downsampling ratio. As another example, the block downsampling can be applied to only one dimension of the sub-block. As a further example, the block downsampling can be performed on the sub-block if the size of the sub-block is larger than a predetermined threshold.

In some embodiments, method 1800 can include splitting the predicted block or the difference block into a plurality of sub-blocks. A size of the sub-blocks can be dependent on a size of the predicted block or the difference block.

At step 1806, method 1800 can include in response to a first sub-block having an SATD less than a predetermined threshold, terminating a BDOF process or a DMVR process applied to the first sub-block. For example, in response to the SATD for a pair of motion vectors of the first sub-block being less than a predetermined threshold, the pair of motion vectors of the first sub-block can be determined as refined motion vectors.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The embodiments may further be described using the following clauses:

1. A computer-implemented method comprising:
   determining a plurality of first blocks associated with a first motion vector and a plurality of second blocks associated with a second motion vector;
   determining a sum of absolute transformed difference (SATD) between one of the plurality of first blocks and one of the plurality of second blocks; and
   refining the first motion vector and the second motion vector based on the determined SATDs.

2. The method of clause 1, wherein the plurality of first blocks associated with the first motion vector comprise:
   an original first block on an original first position referred to by the first motion vector; and
   at least one shifted first block on a position shifted from the original first position, and
   wherein the plurality of second blocks associated with the second motion vector comprise:
   an original second block on an original second position referred to by the second motion vector; and
   at least one shifted second block on a position shifted from the original second position.

3. The method of clause 1 or clause 2, wherein determining the SATD comprises:
   generating a difference block between one of the plurality of first blocks and one of the plurality of second blocks;
   performing a first transform on the difference block, to generate a plurality of absolute transformed coefficients; and
   determining a sum of the plurality of absolute transformed coefficients, as the SATD associated with the one of the plurality of first blocks and the one of the plurality of second blocks.

4. The method of clause 3, further comprising:
   performing downsampling on the difference block, before the first transform is performed on the difference block; or
   performing dowsampling on the one of the plurality of first blocks and the one of the plurality of second blocks, before generating the difference block.

5. The method of clause 4, wherein the downsampling comprises:
   applying a first downsampling ratio to a first dimension of the difference block or the one of the plurality of first blocks and the one of the plurality of second blocks.

6. The method of clause 5, wherein the downsampling further comprises:
   applying a second downsampling ratio to a second dimension of the difference block or the one of the plurality of first blocks and the one of the plurality of second blocks.

7. The method of clause 3, further comprising:
   before the first transform is performed on the difference block,
      determining a size of the difference block; and
      in response to the size of the difference block being determined to be larger than a predetermined threshold, performing downsampling on the difference block.

8. The method of clause 3, wherein performing the first transform on the difference block, to generate the plurality of absolute transformed coefficients comprises:

splitting the difference block into a plurality of difference sub-blocks; and performing the first transform on the plurality of difference sub-blocks, to generate the plurality of absolute transformed coefficients.

9. The method of clause 3, wherein generating the difference block comprises:

splitting the one of the plurality of first blocks and the one of the plurality of second blocks into a plurality of first sub-blocks and a plurality of second sub-blocks, respectively; and generating difference sub-blocks between each of the plurality of first sub-blocks and a corresponding second sub-block, and wherein performing the first transform on the difference block comprises:

performing the first transform on the difference sub-blocks, to generate the plurality of absolute transformed coefficients.

10. The method of clause 8, further comprising:

selecting a direct current (DC) coefficient from the transformed coefficients of each of the plurality of difference sub-blocks to form a selected block;

performing a second transform on the selected block;

placing elements in the transformed selected block back to the plurality of difference sub-blocks; and determining a sum of absolute values of coefficients of the plurality of difference sub-blocks, as the SATD.

11. The method of clause 3, wherein the first transform is a Hadamard transform, a discrete cosine transform (DCT), or a discrete sine transform (DST).

12. The method of clause 10, wherein the second transform is a Hadamard transform, a discrete cosine transform (DCT), or a discrete sine transform (DST).

13. The method of any of clauses 1-12, wherein refining the motion vector comprises:

determining a first block and a second block with a lowest SATD; and determining a refined motion vector based on the determined first block and second block with the lowest SATD.

14. The method of any of clauses 1-13, wherein refining the motion vector comprises:

performing a fractional sample refinement.

15. An apparatus, comprising:

a memory configured to store instructions; and a processor coupled to the memory and configured to execute the instructions to cause the apparatus to:

determine a plurality of first blocks associated with a first motion vector and a plurality of second blocks associated with a second motion vector;

determine a sum of absolute transformed difference (SATD) between one of the plurality of first blocks and one of the plurality of second blocks; and refine the first motion vector and the second motion vector based on the determined SATDs.

16. The apparatus of clause 15, wherein the plurality of first blocks associated with the first motion vector comprise:

an original first block on an original first position referred to by the first motion vector; and at least one shifted first block on a position shifted from the original first position, and wherein the plurality of second blocks associated with the second motion vector comprise:

an original second block on an original second position referred to by the second motion vector; and at least one shifted second block on a position shifted from the original second position.

17. The apparatus of clause 15 or clause 16, wherein the processor is further configured to execute the instructions to cause the apparatus to:

generate a difference block between one of the plurality of first blocks and one of the plurality of second blocks;

perform a first transform on the difference block, to generate a plurality of absolute transformed coefficients; and determine a sum of the plurality of absolute transformed coefficients, as the SATD associated with the one of the plurality of first blocks and the one of the plurality of second blocks.

18. The apparatus of clause 17, wherein the processor is further configured to execute the instructions to cause the apparatus to:

perform downsampling on the difference block, before the first transform is performed on the difference block; or perform dowsampling on the one of the plurality of first blocks and the one of the plurality of second blocks, before generating the difference block.

19. The apparatus of clause 18, wherein the downsampling comprises:

applying a first downsampling ratio to a first dimension of the difference block or the one of the plurality of first blocks and the one of the plurality of second blocks.

20. The apparatus of clause 19, wherein the downsampling further comprises:

applying a second downsampling ratio to a second dimension of the difference block or the one of the plurality of first blocks and the one of the plurality of second blocks.

21. The apparatus of clause 17, wherein the processor is further configured to execute the instructions to cause the apparatus to:

before the first transform is performed on the difference block, determine a size of the difference block; and in response to the size of the difference block being determined to be larger than a predetermined threshold, perform downsampling on the difference block.

22. The apparatus of clause 17, wherein the processor is further configured to execute the instructions to cause the apparatus to:

split the difference block into a plurality of difference sub-blocks; and perform the first transform on the plurality of difference sub-blocks, to generate the plurality of absolute transformed coefficients.

23. The apparatus of clause 17, wherein the processor is further configured to execute the instructions to cause the apparatus to:

split the one of the plurality of first blocks and the one of the plurality of second blocks into a plurality of first sub-blocks and a plurality of second sub-blocks, respectively;

generate difference sub-blocks between each of the plurality of first sub-blocks and a corresponding second sub-block; and perform the first transform on the difference sub-blocks, to generate the plurality of absolute transformed coefficients.

24. The apparatus of clause 22, wherein the processor is further configured to execute the instructions to cause the apparatus to:

select a direct current (DC) coefficient from the transformed coefficients of each of the plurality of difference sub-blocks to form a selected block;

perform a second transform on the selected block;

place elements in the transformed selected block back to the plurality of difference sub-blocks; and determine a sum of absolute values of coefficients of the plurality of the difference sub-blocks, as the SATD.

25. The apparatus of clause 17, wherein the first transform is a Hadamard transform, a discrete cosine transform (DCT), or a discrete sine transform (DST).

26. The apparatus of clause 24, wherein the second transform is a Hadamard transform, a discrete cosine transform (DCT), or a discrete sine transform (DST).

27. The apparatus of any of clauses 15-26, wherein the processor is further configured to execute the instructions to cause the apparatus to:
  determine a first block and a second block with a lowest SATD; and
  determine a refined motion vector based on the determined first block and second block with the lowest SATD.

28. The apparatus of any of clauses 15-27, wherein the processor is further configured to execute the instructions to cause the apparatus to
  perform a fractional sample refinement.

29. A non-transitory computer-readable storage medium storing a set of instructions that are executable by one or more processors of a device, wherein the execution of the set of instructions causes the device to perform:
  determining a plurality of first blocks associated with a first motion vector and a plurality of second blocks associated with a second motion vector;
  determining a sum of absolute transformed difference (SATD) between one of the plurality of first blocks and one of the plurality of second blocks; and
  refining the first motion vector and the second motion vector based on the determined SATDs.

30. The non-transitory computer-readable storage medium of clause 29, wherein the plurality of first blocks associated with the first motion vector comprise:
  an original first block on an original first position referred to by the first motion vector; and
  at least one shifted first block on a position shifted from the original first position, and
  wherein the plurality of second blocks associated with the second motion vector comprise:
  an original second block on an original second position referred to by the second motion vector; and
  at least one shifted second block on a position shifted from the original second position.

31. The non-transitory computer-readable storage medium of clause 29 or clause 30, wherein determining the SATD comprises:
  generating a difference block between one of the plurality of first blocks and one of the plurality of second blocks;
  performing a first transform on the difference block, to generate a plurality of absolute transformed coefficients; and
  determining a sum of the plurality of absolute transformed coefficients, as the SATD associated with the one of the plurality of first blocks and the one of the plurality of second blocks.

32. The non-transitory computer-readable storage medium of clause 31, wherein the execution of the set of instructions causes the device to perform:
  downsampling on the difference block, before the first transform is performed on the difference block; or
  performing dowsampling on the one of the plurality of first blocks and the one of the plurality of second blocks, before generating the difference block.

33. The non-transitory computer-readable storage medium of clause 32, wherein the downsampling comprises:
  applying a first downsampling ratio to a first dimension of the difference block or the one of the plurality of first blocks and the one of the plurality of second blocks.

34. The non-transitory computer-readable storage medium of clause 33, wherein the downsampling further comprises:
  applying a second downsampling ratio to a second dimension of the difference block or the one of the plurality of first blocks and the one of the plurality of second blocks.

35. The non-transitory computer-readable storage medium of clause 31, wherein the execution of the set of instructions causes the device to perform:
  before the first transform is performed on the difference block,
    determining a size of the difference block; and
    in response to the size of the difference block being determined to be larger than a predetermined threshold, performing downsampling on the difference block.

36. The non-transitory computer-readable storage medium of clause 31, wherein performing the first transform on the difference block, to generate the plurality of absolute transformed coefficients comprises:
  splitting the difference block into a plurality of difference sub-blocks; and
  performing the first transform on the plurality of difference sub-blocks, to generate the plurality of absolute transformed coefficients.

37. The non-transitory computer-readable storage medium of clause 31, wherein generating the difference block comprises
  splitting the one of the plurality of first blocks and the one of the plurality of second blocks into a plurality of first sub-blocks and a plurality of second sub-blocks, respectively; and
  generating difference sub-blocks between each of the plurality of first sub-blocks and a corresponding second sub-block, and
  wherein performing the first transform on the difference block comprises:
  performing the first transform on the difference sub-blocks, to generate the plurality of absolute transformed coefficients.

38. The non-transitory computer-readable storage medium of clause 36, wherein the execution of the set of instructions causes the device to perform:
  selecting a direct current (DC) coefficient from the transformed coefficients of each of the plurality of difference sub-blocks to form a selected block;
  performing a second transform on the selected block;
  placing elements in the transformed selected block back to the plurality of difference sub-blocks; and
  determining a sum of absolute values of coefficients of the plurality of difference sub-blocks, as the SATD.

39. The non-transitory computer-readable storage medium of clause 31, wherein the first transform is a Hadamard transform, a discrete cosine transform (DCT), or a discrete sine transform (DST).

40. The non-transitory computer-readable storage medium of clause 38, wherein the second transform is a Hadamard transform, a discrete cosine transform (DCT), or a discrete sine transform (DST).

41. The non-transitory computer-readable storage medium of any of clauses 29-40, wherein refining the motion vector comprises:
  determining a first block and a second block with a lowest SATD; and
  determining a refined motion vector based on the determined first block and second block with the lowest SATD.

42. The non-transitory computer-readable storage medium of any of clauses 29-41, wherein refining the motion vector comprises:
  performing a fractional sample refinement.
43. A computer-implemented method, comprising:
  splitting a coding unit into a plurality of sub-blocks;
  determining a sum of absolute transformed difference (SATD) for each of the plurality of sub-blocks; and
  in response to a first sub-block having an SATD less than a predetermined threshold, terminating a bi-directional optical flow (BDOF) process or a decoder side motion vector refinement (DMVR) process applied to the first sub-block.
44. The method of clause 46, wherein determining the SATD comprises:
  for each sub-block,
    determining two predicted blocks associated with two motion vectors of the sub-block, respectively;
    determining a difference block of the two predicted blocks;
    performing a transform on the difference block to generate a plurality of absolute transformed coefficients; and
    determining a sum of the plurality of absolute transformed coefficients, as the SATD for the two motion vectors of the sub-block.
45. The method of clause 46 or clause 47, wherein terminating the DMVR process applied to the first sub-block comprises:
  in response to the SATD for the two motion vectors of the sub-block being less than a predetermined threshold, determining the two motion vectors of the sub-block as refined motion vectors.
46. The method of clause 47, further comprising:
  performing downsampling on the sub-block, before the two predicted blocks are determined.
47. The method of any of clauses 46-49, wherein the transform is a Hadamard transform, a discrete cosine transform (DCT), or a discrete sine transform (DST).
48. An apparatus, comprising:
  a memory configured to store instructions; and
  a processor coupled to the memory and configured to execute the instructions to cause the apparatus to:
    split a coding unit into a plurality of sub-blocks;
    determine a sum of absolute transformed difference (SATD) for each of the plurality of sub-blocks; and
    in response to a first sub-block having an SATD less than a predetermined threshold, terminate a bi-directional optical flow (BDOF) process or a decoder side motion vector refinement (DMVR) process applied to the first sub-block.
49. The apparatus of clause 51, wherein the processor is further configured to execute the instructions to cause the apparatus to:
  for each sub-block,
    determine two predicted blocks associated with two motion vectors of the sub-block, respectively;
    determine a difference block of the two predicted blocks;
    perform a transform on the difference block to generate a plurality of absolute transformed coefficients; and
    determine a sum of the plurality of absolute transformed coefficients, as the SATD for the two motion vectors of the sub-block.
50. The apparatus of clause 51 or clause 52, wherein the processor is further configured to execute the instructions to cause the apparatus to:
  in response to the SATD for the two motion vectors of the sub-block being less than a predetermined threshold, determine the two motion vectors of the sub-block as refined motion vectors.
51. The apparatus of clause 52, wherein the processor is further configured to execute the instructions to cause the apparatus to:
  perform downsampling on the sub-block, before the two predicted blocks are determined.
52. The apparatus of any of clauses 51-54, wherein the transform is a Hadamard transform, a discrete cosine transform (DCT), or a discrete sine transform (DST).
53. A non-transitory computer-readable storage medium storing a set of instructions that are executable by one or more processors of a device, wherein the execution of the set of instructions causes the device to perform:
  splitting a coding unit into a plurality of sub-blocks;
  determining a sum of absolute transformed difference (SATD) for each of the plurality of sub-blocks; and
  in response to a first sub-block having an SATD less than a predetermined threshold, terminating a bi-directional optical flow (BDOF) process or a decoder side motion vector refinement (DMVR) process applied to the first sub-block.
54. The non-transitory computer-readable storage medium of clause 56, wherein determining the SATD comprises:
  for each sub-block,
    determining two predicted blocks associated with two motion vectors of the sub-block, respectively;
    determining a difference block of the two predicted blocks;
    performing a transform on the difference block to generate a plurality of absolute transformed coefficients; and
    determining a sum of the plurality of absolute transformed coefficients, as the SATD for the two motion vectors of the sub-block.
55. The non-transitory computer-readable storage medium of clause 56 or clause 57, wherein terminating the DMVR process applied to the first sub-block comprises:
  in response to the SATD for the two motion vectors of the sub-block being less than a predetermined threshold, determining the two motion vectors of the sub-block as refined motion vectors.
56. The non-transitory computer-readable storage medium of clause 57, wherein the execution of the set of instructions further cause the device to perform:
  downsampling on the sub-block, before the two predicted blocks are determined.
57. The non-transitory computer-readable storage medium of any of clauses 56-59, wherein the transform is a Hadamard transform, a discrete cosine transform (DCT), or a discrete sine transform (DST).

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art can also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A computer-implemented method comprising:
    determining a first motion vector and a second motion vector, wherein the first motion vector and the second motion vector are associated with a target block;
    determining a first set of predicted blocks based on the first motion vector, and determining a second set of predicted blocks based on the second motion vector;
    determining a sum of absolute transformed difference (SATD) between one of the first set of predicted blocks and one of the second set of predicted blocks, wherein determining the SATD comprises:
        generating a difference block between one of the first set of predicted blocks and one of the second set of predicted blocks;
        splitting the difference block into a plurality of difference sub-blocks;
        performing a first transform on the plurality of difference sub-blocks, to generate one or more transformed coefficients for each of the plurality of difference sub-blocks;
        selecting a direct current (DC) coefficient from the one or more transformed coefficients of each of the plurality of difference sub-blocks to form a selected block;
        performing a second transform on the selected block;
        placing elements in the transformed selected block back to the plurality of difference sub-blocks; and
        determining a sum of absolute values of coefficients of the plurality of difference sub-blocks, as the SATD associated with the one of the first set of predicted blocks and the one of the second set of predicted blocks; and
    refining the first motion vector and the second motion vector based on the determined SATDs.

2. The method of claim 1, wherein the first set of predicted blocks comprise:
    an original first block on an original first position referred to by the first motion vector; and
    at least one shifted first block on a position shifted from the original first position, and
    wherein the second set of predicted blocks comprise:
    an original second block on an original second position referred to by the second motion vector; and
    at least one shifted second block on a position shifted from the original second position.

3. The method of claim 1, further comprising:
    performing downsampling on the difference block, before the first transform is performed on the difference block; or
    performing downsampling on the one of the first set of predicted blocks and the one of the second set of predicted blocks, before generating the difference block.

4. The method of claim 1, wherein generating the difference block comprises:
    splitting the one of the first set of predicted blocks and the one of the second set of predicted blocks into a first set of sub-blocks and a second set of sub-blocks, respectively; and
    generating difference sub-blocks between each of the first set of predicted sub-blocks and a corresponding second sub-block, and
    wherein performing the first transform on the difference block comprises:
    performing the first transform on the difference sub-blocks, to generate the plurality of absolute transformed coefficients.

5. The method of claim 1, wherein the first transform is a Hadamard transform, a discrete cosine transform (DCT), or a discrete sine transform (DST).

6. The method of claim 1, wherein refining the motion vector comprises:
    determining a first block and a second block with a lowest SATD; and
    determining a refined motion vector based on the determined first block and second block with the lowest SATD.

7. An apparatus, comprising:
    a memory configured to store instructions; and
    a processor coupled to the memory and configured to execute the instructions to cause the apparatus to:
        determine a first motion vector and a second motion vector, wherein the first motion vector and the second motion vector are associated with a target block;
        determine a first set of predicted blocks based on the first motion vector, and determine a second set of predicted blocks based on the second motion vector;
        determine a sum of absolute transformed difference (SATD) between one of the first set of predicted blocks and one of the second set of predicted blocks, wherein in determining the SATD, the processor is configured to execute the instructions to cause the apparatus to:

generate a difference block between one of the first set of predicted blocks and one of the second set of predicted blocks;

split the difference block into a plurality of difference sub-blocks;

perform a first transform on the plurality of difference sub-blocks, to generate one or more transformed coefficients for each of the plurality of difference sub-blocks;

select a direct current (DC) coefficient from the one or more transformed coefficients of each of the plurality of difference sub-blocks to form a selected block;

perform a second transform on the selected block;

place elements in the transformed selected block back to the plurality of difference sub-blocks; and determine a sum of absolute values of coefficients of the plurality of difference sub-blocks, as the SATD associated with the one of the first set of predicted blocks and the one of the second set of predicted blocks; and refine the first motion vector and the second motion vector based on the determined SATDs.

8. The apparatus of claim 7, wherein the first set of predicted blocks comprise:

an original first block on an original first position referred to by the first motion vector; and at least one shifted first block on a position shifted from the original first position, and wherein the second set of predicted blocks comprise:

an original second block on an original second position referred to by the second motion vector; and at least one shifted second block on a position shifted from the original second position.

9. The apparatus of claim 7, wherein the processor is further configured to execute the instructions to cause the apparatus to:

perform downsampling on the difference block, before the first transform is performed on the difference block; or perform downsampling on the one of the first set of predicted blocks and the one of the second set of predicted blocks, before generating the difference block.

10. The apparatus of claim 7, wherein the processor is further configured to execute the instructions to cause the apparatus to:

split the one of the first set of predicted blocks and the one of the second set of predicted blocks into a first set of predicted sub-blocks and a second set of predicted sub-blocks, respectively;

generate difference sub-blocks between each of the first set of predicted sub-blocks and a corresponding second sub-block; and perform the first transform on the difference sub-blocks, to generate the plurality of absolute transformed coefficients.

11. The apparatus of claim 7, wherein the processor is further configured to execute the instructions to cause the apparatus to:

determine a first block and a second block with a lowest SATD; and determine a refined motion vector based on the determined first block and second block with the lowest SATD.

12. A non-transitory computer-readable storage medium storing a set of instructions that are executable by one or more processors of a device, wherein the execution of the set of instructions causes the device to perform:

determining a first motion vector and a second motion vector, wherein the first motion vector and the second motion vector are associated with a target block;

determining a first set of predicted blocks based on the first motion vector, and determining a second set of predicted blocks based on the second motion vector;

determining a sum of absolute transformed difference (SATD) between one of the first set of predicted blocks and one of the second set of predicted blocks, wherein determining the SATD comprises:

generating a difference block between one of the first set of predicted blocks and one of the second set of predicted blocks;

splitting the difference block into a plurality of difference sub-blocks;

performing a first transform on the plurality of difference sub-blocks, to generate one or more transformed coefficients for each of the plurality of difference sub-blocks;

selecting a direct current (DC) coefficient from the one or more transformed coefficients of each of the plurality of difference sub-blocks to form a selected block;

performing a second transform on the selected block;

placing elements in the transformed selected block back to the plurality of difference sub-blocks; and determining a sum of absolute values of coefficients of the plurality of difference sub-blocks, as the SATD associated with the one of the first set of predicted blocks and the one of the second set of predicted blocks; and refining the first motion vector and the second motion vector based on the determined SATDs..

13. The non-transitory computer readable storage medium of claim 12, wherein the first set of predicted blocks comprise:

an original first block on an original first position referred to by the first motion vector; and at least one shifted first block on a position shifted from the original first position, and wherein the second set of predicted blocks comprise:

an original second block on an original second position referred to by the second motion vector; and at least one shifted second block on a position shifted from the original second position.

14. The non-transitory computer readable storage medium of claim 12, wherein the execution of the set of instructions causes the device to further perform:

performing downsampling on the difference block, before the first transform is performed on the difference block; or performing downsampling on the one of the first set of predicted blocks and the one of the second set of predicted blocks, before generating the difference block.

* * * * *